US010659409B1

(12) United States Patent
Collins et al.

(10) Patent No.: US 10,659,409 B1
(45) Date of Patent: May 19, 2020

(54) MEDIA ACCESS SYSTEM

(71) Applicant: Snap Inc., Santa Monica, CA (US)

(72) Inventors: John Christopher Collins, Mico, TX (US); Allan Joseph Evans, Los Angeles, CA (US); Ryan Alan Hostetler, Agoura Hills, CA (US); Graham Shaw, Redondo Beach, CA (US)

(73) Assignee: Snap Inc., Santa Monica, CA (US)

( * ) Notice: Subject to any disclaimer, the term of this patent is extended or adjusted under 35 U.S.C. 154(b) by 49 days.

(21) Appl. No.: 16/141,625

(22) Filed: Sep. 25, 2018

Related U.S. Application Data

(60) Provisional application No. 62/566,038, filed on Sep. 29, 2017.

(51) Int. Cl.
H04L 12/58 (2006.01)
H04L 29/06 (2006.01)
H04N 5/232 (2006.01)

(52) U.S. Cl.
CPC .............. H04L 51/10 (2013.01); H04L 51/32 (2013.01); H04L 65/1093 (2013.01); H04L 65/4076 (2013.01); H04N 5/23206 (2013.01)

(58) Field of Classification Search
CPC . H04L 51/10; H04L 65/4076; H04L 65/1093; H04L 51/32; H04N 5/23206
See application file for complete search history.

(56) References Cited

U.S. PATENT DOCUMENTS 10,511,450 B2 * 12/2019 Fung ........................ H04L 63/10
2018/0007099 A1 * 1/2018 Ein-Gil ................... H04L 63/08
2018/0083901 A1 * 3/2018 McGregor, Jr. ......... H04L 51/10

* cited by examiner

Primary Examiner — Kim T Nguyen
(74) Attorney, Agent, or Firm — Schwegman, Lundberg & Woessner, P.A.

(57) ABSTRACT

Systems, devices, media, and methods are presented for providing access to media content within a networked system. The systems and methods receive a notification indicating dispensing of an image capture device by a dispersal machine. In response to receiving the notification, the systems and methods generate a media distribution session associated with the identifier. Media instances or content are published to the media distribution session by associating the media distribution session and the identifier with the media instances or content. The systems and methods receive access requests for the media distribution session and, responsive to the access requests, transmit at least a portion of the media instances or content to a requesting device.

20 Claims, 14 Drawing Sheets

MEDIA ACCESS SYSTEM

RELATED APPLICATIONS

This application claims the priority benefit of U.S. Provisional Application No. 62/566,038 entitled "MEDIA ACCESS SYSTEM," filed Sep. 29, 2017, which is hereby incorporated herein by reference in its entirety.

TECHNICAL FIELD

Embodiments of the present disclosure relate generally to providing access to media content. More particularly, but not by way of limitation, the present disclosure addresses systems and methods for distributing image capture devices and publishing media content of the image capture devices for network access.

BACKGROUND

Telecommunications applications and devices can provide communication between multiple users using a variety of media, such as text, images, sound recordings, and/or video recording. Telecommunications devices capable of capturing and transmitting media across a network are often fragile and expensive. High personal investment in such telecommunications devices often prevents users from employing such devices during times of user activity. Similarly, users may prefer to retain sole possession or use of telecommunications devices due to risk of theft or damage by others. Finally, personal ownership and access to telecommunications devices enables broad use of such devices limited to broad personal ownership of such devices. For example, if a user forgets or loses a telecommunications device, the user may be without such a device while a warranty is being filled or until such time as a new device is procured.

BRIEF DESCRIPTION OF THE DRAWINGS

Various ones of the appended drawings merely illustrate example embodiments of the present disclosure and should not be considered as limiting its scope.

Figure 1:
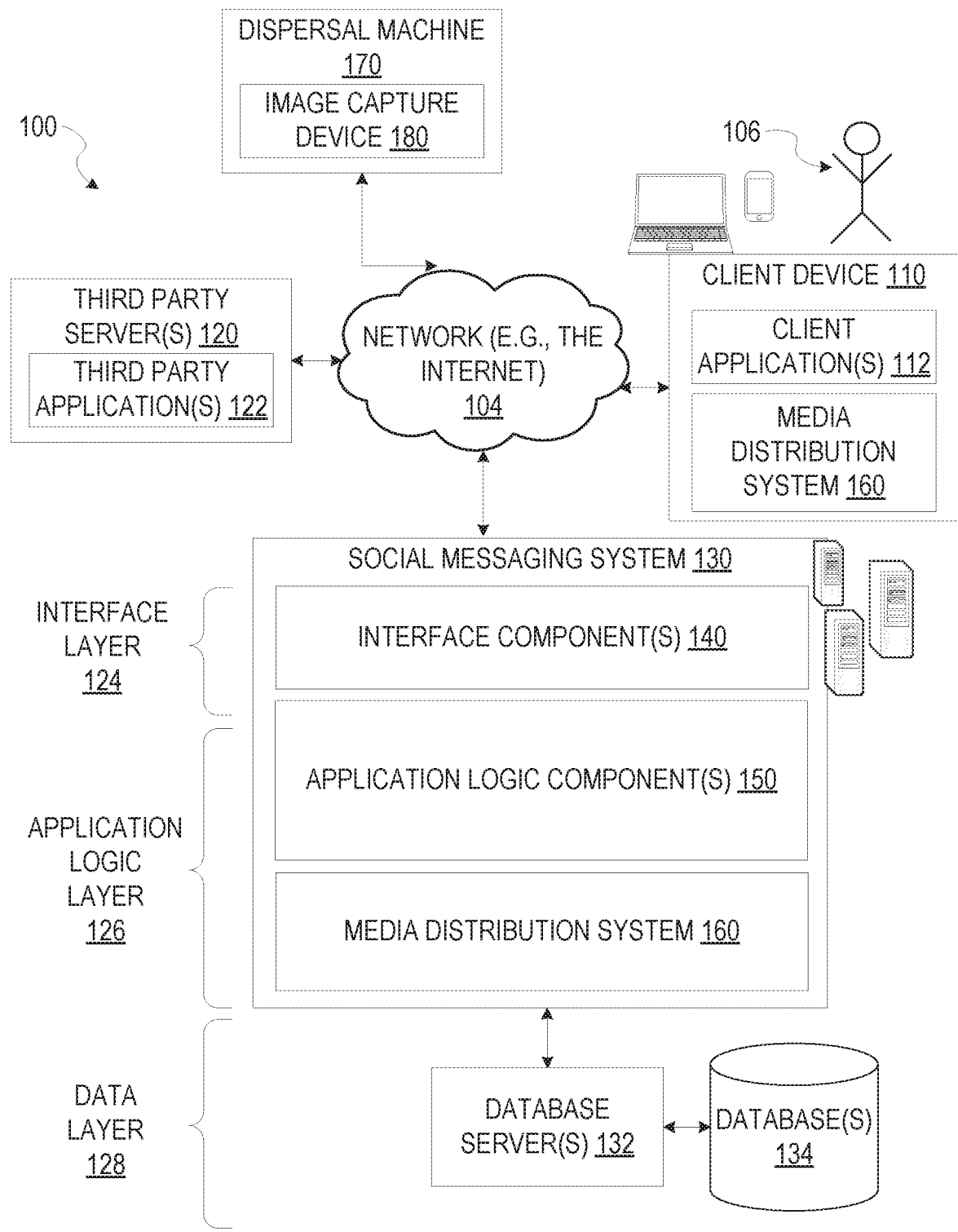
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Media capture devices, such as cameras, smartphones, digital single-lens reflect cameras, point and shoot cameras, and other similar devices provide audio, image, or video capture capabilities to users. Some media capture devices include telecommunications capabilities, enabling sharing, transmitting, and other distribution capabilities. These telecommunications devices are often associated with a high personal investment. Such personal investment often prevents users or causes hesitation in carrying or using telecommunications devices during times of activity or other situations which pose a risk to the telecommunications devices. Further, when a user desires to capture certain images or audio, the user may be hesitant to employ help of others, such as asking another person to take a photo. In handing over the telecommunication device, the user risks another person dropping or stealing the device. Similarly, users risk privacy when handing a telecommunications device to another, where the device stores or has access to personal information of the user. During certain events, activities, or situations, users may forget to bring or provide ample charge to the telecommunications device. For example, a user on vacation may forget the telecommunications device in a hotel room or bag, or leave the device in a taxi. Further, users may run out of battery power due to multi-use telecommunications devices being used for directions, messaging, internet searching, and other purposes in addition to capturing images or videos from their trip.

Currently cameras and other telecommunications devices are not provided to enable sharing of devices within a location, region, destination, community, or other area. Further, cameras and telecommunications devices are not provided to enable creating new content in a shared experience. Content creation is often uploaded manually by a user via an account with a messaging system. Content creation may be separate from the platform or system on which the content will later be shared. As such, a need exists for a machine capable of distributing image capture devices to supplement or replace existing telecommunications devices for periods of time and provide an area- or community-based circulation of image capture devices. The image capture devices may act as a means to upload captured data (e.g., image data, audio data, or video data) to one or more network-based systems. Machines distributing the image capture devices may also act as a means to upload captured data. For example, the distribution machines may act as centralized hubs, transmitting captured data upon return of a circulated image capture device.

Systems and methods described herein describe machines and methods to enable circulation (e.g., distribution and return) of image capture devices. For example, a bot or dispensing machine may be placed within a popular hotel in Maui where weddings are frequently held. A user may select a camera for distribution by the bot. The user may then take pictures and video of the event with the camera. The user may hand the camera to others, passing the camera to various attendees at the wedding to take pictures and video of the event from different perspectives. When attendees inquire about copies of pictures and videos taken by the various attendees, the user may share an identifier (e.g., an account name, a representation of a network address, an encoded network location, etc.). For example, an inquiring attendee may be directed to download a messaging application or a data access application on a smartphone. The inquiring attendee may open the messaging application and scan the identifier (e.g., the identifier presented on another smartphone or on the camera). When the messaging application detects the identifier, the messaging application may automatically load the images and video captured at the wedding. Upon returning the camera to the bot, the captured images, audio, and video may be removed from the camera. The camera may then be recharged, cleaned, and recalibrated for a subsequent user.

By way of further example, a bot may be located in a hostel in Seattle. A user may select a camera and include a note requesting the camera be taken on a trip to Africa and leaves the camera in the hostel. The user may scan or capture a device code for the camera before leaving, following a device, user, or other session for the camera on a messaging application. The user may also share the device code with others to follow the experience and images or video captured by the camera. The user may provide a metadata description for the session, such as tagging the session with a title of "Africa, Travel Camera." A subsequent user at the hostel may take the camera to New York, taking pictures or video of locations, scenery, and people while traveling between Seattle and New York. The subsequent user may leave the camera in New York for a further user to collect. This further user may travel to Africa or any other destination with the camera, capturing images and video along the way. The camera may upload the images and video to the session by wireless or wired communication, enabling each user who captured the device code to share or view the images and video.

Embodiments of the present disclosure describe systems, methods, and devices to distribute cameras, create sessions or accounts associated with a messaging or media distribution application, provide access to media published to the sessions or accounts, and process the camera once the camera has been returned to the distributing machine. In some embodiments, devices, such as smart phones, which are paired or otherwise associated with the sessions, may be provided with access to images, video, and audio captured by distributed cameras associated with the session or account. When cameras are returned to a machine configured for distribution of cameras, the machine may remove captured data; clean, recalibrate, repair, or otherwise process the camera; and return the camera to circulation. When the camera is again distributed, a new session or account may be established for sharing or otherwise distributing newly captured data.

In some embodiments, a distributing or dispersing machine may connect to a data transmission port of cameras being distributed. Upon connecting to the data transmission port, the dispersing machine may upload images, video, or audio, captured by the camera, to an associated session or account. The dispersing machine may upload the captured data using any suitable network (e.g., a wireless network, a cellular network, a satellite network, a wired network connection, etc.). The dispersing machine may also upload the captured data, received from a localized connection to the camera (e.g., a BLUETOOTH® connection) and then upload the captured data to the session or account using a suitable network connection, such as a mesh network of connected dispensing machines.

As described herein, in some embodiments, machines configured to distribute the cameras are configured to perform error and calibration analysis, cleaning procedures, and other suitable servicing operations on the cameras prior to returning the cameras to circulation or redistribution. For example, a dispensing machine may receive a camera, perform a calibration procedures to determine whether captured images match test images within predefined parameters, and modify one or more settings to recalibrate the camera where a mismatch occurs. Where an error or calibration issue cannot be repaired or otherwise corrected by the dispersing machine, the machine may remove the camera from circulation.

Cameras distributed by the dispensing machines may include viewfinders and imaging sensors, enabling capture of image, video, or audio data. The cameras may also include a display, such as an e-ink display. The display may depict device codes or identifiers for the camera, or identifiers for a session or account associated with the camera. The identifiers, codes, or session identifiers may be changed or otherwise modified. As such, new or unique identifiers may be used each time a camera is distributed or used. In some instances, the cameras may be equipped with communications equipment, such as transceivers configured to wirelessly transmit captured image, video, or audio data to one or more of a messaging application, a messaging system, a media distribution system, or a network of dispensing machines. Where the communications equipment transfers captured data to the network of dispensing machines, the dispensing machines may then transfer the captured data to one or more of the messaging application, the messaging system, and the media distribution system for access by various geographically distributed users.

Data captured by the cameras may be tagged or marked, within the data or in metadata associated therewith. For example, captured data may be tagged with geographical information relating to a location, an event, or a venue at which the data is captured by the camera. In some embodiments, the captured data may be tagged with sponsor information associated with people, events, charities, companies, or other entities responsible for a dispensing machine being placed at a given location, venue, or event.

The above are specific examples. The various embodiments of the present disclosure relate to devices and instructions by one or more processors and mechanical components of a device to distribute image capture devices and audio/visual media captured by such image capture devices to provide access to media content. A media distribution system is described that provides access to media content. The media distribution system may receive media instances or content generated by image capture devices dispensed by a network of dispersal machines, and distribute the media content via a communications network to sessions or accounts generated for the image capture devices.

FIG. 1 is a network diagram depicting a networked system 100 having a client-server architecture configured for exchanging data over a network, according to one embodiment. For example, the networked system 100 may be a messaging system where clients communicate and exchange data within the networked system 100. The data may pertain to various functions (e.g., sending and receiving text and media communication, determining geolocation, etc.) and aspects (e.g., transferring communications data, receiving and transmitting indications of communication sessions, etc.) associated with the networked system 100 and its users. Although illustrated herein as client-server architecture, other embodiments may include other network architectures, such as peer-to-peer or distributed network environments.

As shown in FIG. 1, the networked system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third-party server(s) 120 executing third-party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of media distribution system 160 such that components of the media distribution system 160 configure the client device 110 to perform a specific set of functions with respect to operations of the media distribution system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the media distribution system 160 to provide access to media content captured by image capture devices distributed by a network of dispersal machines.

Each client device 110 can comprise a computing device that includes at least a display and communication capabilities with the network 104 to access the social messaging system 130, other client devices, and third-party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the networked system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the media distribution system 160 capable of distributing image capture devices and providing access to media content captured or generated by such devices. Similarly, the client device 110 includes at least a portion of the media distribution system 160, as described above. In other examples, the client device 110 may include the entirety of the media distribution system 160. In instances where the client device 110 includes a portion of (or all of) the media distribution system 160, the client device 110 can work alone or in cooperation with the social messaging system 130 to provide the functionality of the media distribution system 160 described herein.

In some embodiments, the social messaging system 130 may be an ephemeral message system that enables ephemeral communications where content (e.g., video clips or images) is deleted following a deletion trigger event such as a viewing time or viewing completion. In such embodiments, a device uses the various components described herein within the context of any of generating, sending, receiving, or displaying aspects of an ephemeral message. For example, a device implementing the media distribution system 160 may provide access to media content generated by image capture devices distributed by a plurality of dispersal machines. The device may publish the media content as a part of a generation or access of content for an ephemeral message.

Figure 2:
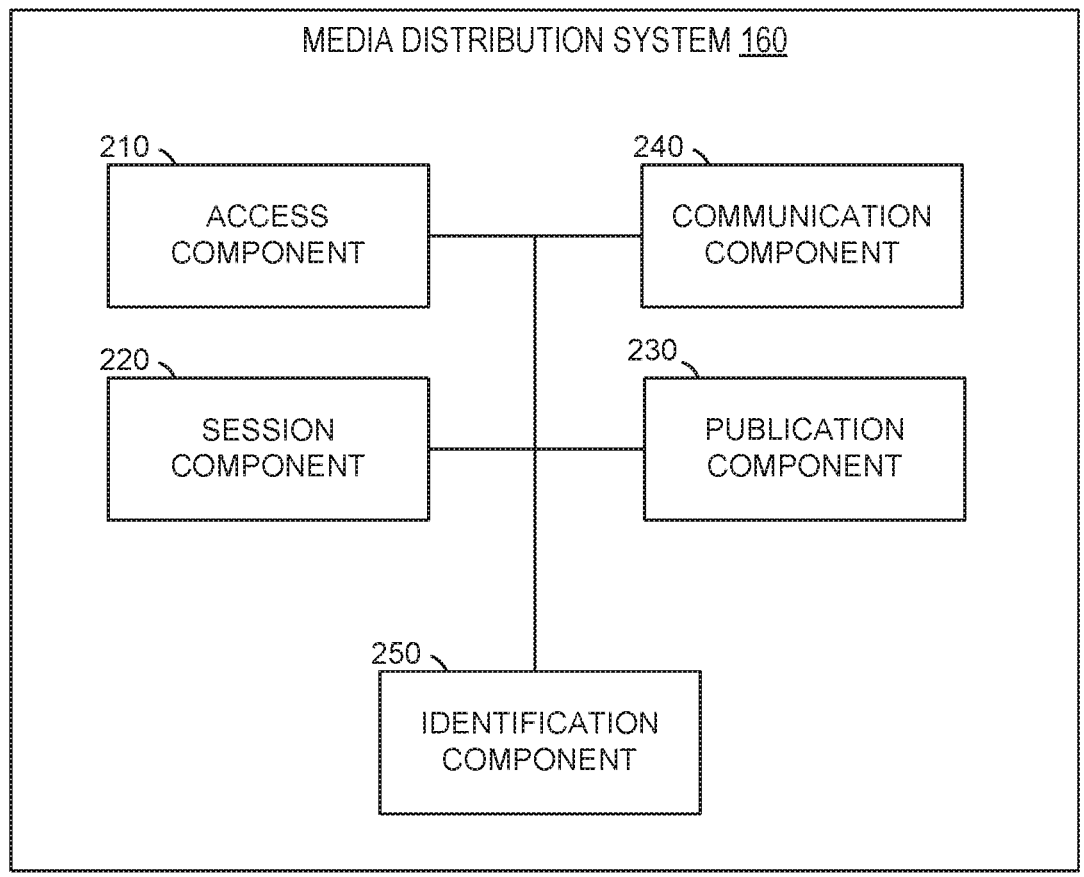
FIG. 2 is a diagram illustrating a media distribution system, according to some example embodiments.

In FIG. 2, in various embodiments, the media distribution system 160 can be implemented as a standalone system or implemented in conjunction with the client device 110, and is not necessarily included in the social messaging system 130. The media distribution system 160 is shown to include an access component 210, a session component 220, a publication component 230, a communication component 240, and an identification component 250. All, or some, of the components 210-250 communicate with each other, for example, via a network coupling, shared memory, and the like. Each component of components 210-250 can be implemented as a single component, combined into other components, or further subdivided into multiple components. Other components not pertinent to example embodiments can also be included, but are not shown.

Figure 3:
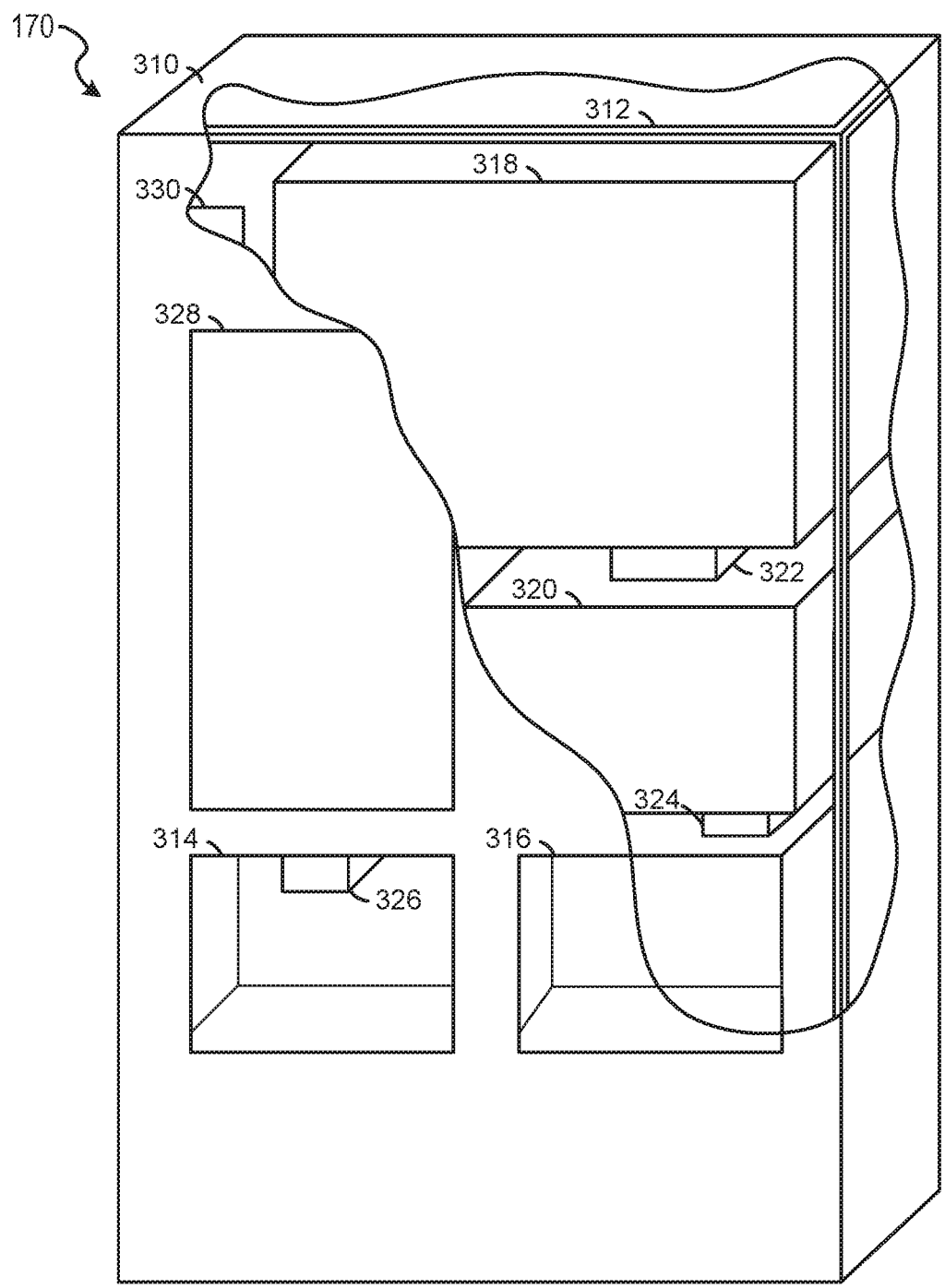
FIG. 3 is a block diagram illustrating a dispersal machine, according to some example embodiments.

In FIG. 3, in various embodiments, the dispersal machine 170 can be implemented as a standalone system or machine, such as a kiosk or vending machine. The dispersal machine 170 may operate in cooperation with one or more of the client device 110, the media distribution system 160, and the social messaging system 130. The dispersal machine 170 is shown to include one or more components to physically dispense or distribute image capture devices (e.g., the image capture device 180) responsive to a user interaction with the dispersal machine 170. In some embodiments, the dispersal machine 170 comprises a housing 310, a frame 312, a provision component 314, a deposit component 316, a storage component 318, an error component 320, a storage conveyor 322 extending between the storage component 318 and the error component 320, a return conveyor 324 extending between the deposit component 316 and the error component 320, a dispensing conveyor 326 extending between the storage component 318 and the provision component 314, a display component 328, and a communications component 330. Although described with specific components and implementation details, it should be understood that the functions of the dispersal machine 170 described herein may be performed by one or more of the described components, combined components, or distributed among additional components not explicitly described, without departing from the scope of the present inventive concepts.

The housing 310 of the dispersal machine 170 may be coupled to the frame 312. The housing 310 may be coupled to the frame 312 in any suitable manner, such as mechanical connections (e.g., screws, nuts and bolts, etc.), chemical bonds (e.g., a glue or epoxy), or integrating connection (e.g., welding or brazing). In some embodiments, the housing 310 comprises one or more panels coupled to the frame 312 at one or more points. The one or more panels form a shell or enclosure at least partially encompassing or enclosing the frame 312 and at least a portion of the components of the dispersal machine 170 described herein. The one or more panels may be formed from metal, plastic, or any other material suitable for coupling to the frame 312 and enclosing components of the dispersal machine 170. Although described with respect to panels, it should be understood that the housing 310 may be integrally formed, formed from one or more parts which may not be defined as panels, or otherwise composed of any suitable configuration to at least partially encompass or enclose the components of the dispersal machine 170 described herein.

In some instances, the housing 310 defines one or more openings configured to provide access to one or more components of the dispersal machine 170. For example, as described herein, a single opening or multiple openings, defined by the housing 310, may correspond to one or more of the provision component 314, the deposit component 316, and the display component 328. The housing 310 may also define openings for one or more user operation elements (e.g., buttons for operation of the dispersal machine 170), a power element (e.g., a cord or plug extending from the dispersal machine 170 to an external power source), and any other suitable elements or components.

The frame 312 may be coupled to at least a portion of the housing 310. In some embodiments, the frame 312 is comprised of one or more frame members forming a rigid structure configured to support the housing 310 and at least a portion of the components of the dispersal machine 170, described herein. For example, the frame 312 may form a rectangular structure to which the one or more panels of the housing 310 may be affixed. The rectangular structure may be formed by one or more outer frame members and include one or more inner frame members configured to support or be coupled to at least a portion of the components of the dispersal machine 170 which are encompassed or partially encompassed by the housing 310. Although described as a rectangular structure, it should be understood that the frame 312 may be configured as any suitably shaped structure. As such, portions of the frame 312 may be rectangular in shape, while other portions of the frame 312 may be curved, angled, or otherwise disposed to form shapes other than a square or rectangle.

The one or more frame members may be composed of metal, plastic, composite materials, or any other suitable material or structure suitable to form a rigid structure supporting the housing 310 and at least a portion of the components of the dispersal machine 170. In some embodiments, the one or more frame members may be formed by casting, extrusion, forging, three-dimensional printing, molding, or any other suitable manufacturing techniques. Where the frame 312 is comprised of a single frame member, the frame member may be manufactured as a single integral unit or member. Where the frame 312 is comprised of a plurality of frame members, the plurality of frame members may each be manufactured using one or more of the techniques described above. Each frame member, of the plurality of frame members, may then be coupled to at least one other frame member to form the frame 312. The frame members may be coupled together using mechanical connections, chemical bonds, or any other suitable coupling method. For example, frame members of the plurality of frame members may be coupled together using one or more bolts, nuts and bolts, screws, braces, welding, glue or other chemical-based bonding agent, or any other suitable manner.

The provision component 314 may be configured to dispense or otherwise provide physical access to the image capture device 180 when the image capture device 180 is distributed from the dispersal machine 170. In some embodiments, the provision component 314 corresponds to an opening defined by or formed within the housing 310 and supported by the frame 312. For example, a portion of the provision component 314 may be configured as a dispensing bin and opening within the housing 310. The dispensing bin may be configured to receive and provide access to the image capture device 180 while the image capture device 180 is being distributed by the dispersal machine 170. In some embodiments, the provision component 314 includes an enclosure configured to be positioned across the opening within the housing 310, preventing access to the provision component 314 and the dispensing bin. Upon a user interacting with the dispersal machine 170 to dispense the image capture device 180, the provision component 314 uses one or more motive elements (e.g., a motor, lever, or other conveyance) to move the enclosure from a closed position to an open position, enabling access to the dispensing bin of the provision component 314. In some embodiments, the provision component 314 comprises one or more motive elements configured to move an enclosure, position the image capture device 180, or otherwise assist in dispensing the image capture device 180.

The deposit component 316 may be configured to receive the image capture device 180 upon return of the image capture device 180 to the dispersal machine 170. The deposit component 316 may transfer the received image capture device 180 to one or more component of the dispersal machine 170 for maintenance, data transfer, storage, or other processing. In some embodiments, the deposit component 316 corresponds to an opening defined by or formed within the housing 310 and supported by the frame 312. The deposit component 316 may comprise a receiving bin, an opening defined within the housing 310 and providing access to the receiving bin, an enclosure, and one or more motive elements. The user may interact with the dispersal machine 170, indicating return of the image capture device 180. The deposit component 316 may engage the one or more motive elements to move the enclosure from a closed position to an open position. The receiving bin may be configured, sized and shaped, to receive the image capture device 180. Once the image capture device 180 is received within the receiving bin, the deposit component 316 may engage the one or more motive elements to close the enclosure and prevent access to the receiving bin. In some embodiments, the deposit component 316 and the provision component 314 are the same component, configured to dispense and receive the image capture device 180 through the same opening defined within the housing 310.

In some embodiments, the storage component 318 comprises a body, formed by one or more structural members. The body of the storage component 318 may define a void in which a plurality of image capture devices 180 are stored prior to dispensing by the dispersal machine 170 and after receipt of the previously dispensed image capture devices 180. The body of the storage component 318 may define one or more openings to receive and distribute image capture devices 180. The one or more openings may be configured, sized and shaped, to transfer the image capture devices 180 into and out of the storage component 318.

In some embodiments, the storage component 318 comprises one or more storage elements and one or more motive elements coupled to the one or more storage elements. The one or more storage elements may comprise one or more compartments, configured to house individual image capture devices 180 or a set of image capture devices 180. The one or more storage elements may be defined by one or more sidewalls to define a plurality of voids within the storage component 318. In some instances, the one or more storage elements are interconnected to one or more other storage elements and one or more of the provision component 314 and the deposit component 316. The one or more motive elements may transfer or otherwise convey the image capture devices 180 within the storage component 318 to individual storage elements. The one or more motive elements may include one or more of a conveyor (e.g., a belt, a screw, etc.), mechanical arms, or any other suitable elements or components configured to physically move image capture devices 180 within the storage component 318.

In some embodiments, the error component 320 comprises a body with one or more sidewalls defining a void, a calibration surface positioned on at least one sidewall of the one or more sidewalls, a diagnostic bay positioned within the body and configured to direct an imaging sensor of the image capture device 180 toward at least a portion of the calibration surface, and one or more motive elements configured to position image capture devices 180 within the diagnostic bay and directed toward the calibration surface. The error component 320 may be configured to receive image capture devices 180 from the deposit component 316.

In some embodiments, the diagnostic bay comprises a floor of the error component 320. The diagnostic bay may comprise a data transfer port, such as a universal serial bus (USB) port, a mini-USB port, a USB 3.0 port, high-definition multimedia interface (HDMI) port, or any other suitable data transfer connection associated with one or more data transfer protocol. In some instances, the floor of the error component 320 is configured to position the image capture component (e.g., a sensor of the image capture device 180) in a manner that directs the imaging sensor of the image capture component toward at least a portion of the calibration surface. For example, the floor may include one or more ridges, one or more angled surfaces, one or more connectors, or any other suitable formation configured to position the image capture device 180. Upon being positioned on the floor of the error component 320, the data transfer port may be connected to a port of the image capture device 180. The data transfer port of the error component 320 may be coupled to one or more processor of the dispersal machine 170 and enable the dispersal machine 170 to perform one or more diagnostic operations on the image capture device 180.

The calibration surface may be configured to enable image quality testing of the imaging sensor within the image capture device 180. The calibration surface may be positioned a specified and predetermined distance from the data transfer port of the diagnostic bay. In some embodiments, the calibration surface comprises one or more of a color wheel, diagnostic patterns, and any other suitable visual calibration elements having one or more known values. When coupled to the data transfer port and positioned at the diagnostic bay, one or more of the error component 320 and another component of the dispersal machine 170 are configured to cause the imaging component within the image capture device 180 to capture an image of at least a portion of the calibration surface. The image data captured by the imaging component may be analyzed by one or more of the error component 320 and another component of the dispersal machine 170 to determine differences between the image data and test data expected for image data captured of the portion of the calibration surface by a properly functioning and calibrated imaging sensor.

When the error component 320 identifies a difference between the image data captured by the imaging sensor and the test data, the error component 320 or another component of the dispersal machine 170 may identify one or more errors causing the difference between the image data and the test data and perform one or more corrective operations. For example, one or more processors of the error component 320 or another component of the dispersal machine 170 may detect a mismatch of one or more colors between the image data and the test data. The one or more processors may modify one or more settings, parameters, or other programmable aspects of the image capture device 180 to correct the color mismatch. In some embodiments, the error component 320 may engage the one or more motive elements to correct an error by replacing one or more component, of the image capture device 180, associated with the error. Where the error component 320 detects one or more errors, damage, or other issues which are not correctable by recalibration or component replacement, the error component 320 may designate an image capture device 180 as damaged and transfer the damaged image capture device to a portion of the storage component 318 designated for damaged image capture devices removed from circulation.

The storage conveyor 322 may be a motive element extending between or effectively coupling the storage component 318 and the error component 320. The storage conveyor 322 may be positioned between or proximate to the storage component 318 and the error component 320. In some embodiments, the storage conveyor 322 is a mechanical device configured to transfer image capture devices 180 from the error component 320 to one or more portions of the storage component 318. The storage conveyor 322 may include one or more of a conveyor belt, a screw, a mechanical arm, a roller conveyor, a zero pressure conveyor, a minimum pressure conveyor, a pneumatic conveyor, a drag chain, a table top chain, or any other suitable mechanical device capable of transferring an image capture device 180 from the error component 320 to the storage component 318. In some instances, the storage conveyor 322 defines divergent paths for image capture devices 180 to specified or defined portions of the storage conveyor 322. The storage conveyor 322 may define divergent paths using two or more individual conveyors or by defining a divergent point within the paths. In some embodiments, upon a determination by the error component 320 that an image capture device 180 is ready for storage in the storage component 318 and eventual dispersal, the error component 320 may cause the storage conveyor 322 to transfer the image capture device 180 along a first path to a first portion of the storage component 318. Where the error component 320 determines an image capture device 180 is damaged and unsuitable for dispersal from the dispersal machine 170, the error component 320 may cause the storage conveyor 322 to transfer the image capture device 180 along a second path to a second portion of the storage component 318.

The return conveyor 324 may be a motive element extending between or effectively coupling the storage component 318 and the deposit component 316. Similar to the above description of the storage conveyor 322, the return conveyor 324 may be positioned between or proximate to the storage component 318 and the deposit component 316. In some embodiments, the return conveyor 324 is coupled to the storage component 318 by the error component 320, such that an image capture device 180 transferred from the deposit component 316 to the storage component 318 is first transferred to the error component 320 to process, calibrate, or otherwise evaluate the image capture device 180 prior to returning the image capture device 180 to circulation. The return conveyor 324 may be a mechanical device configured to transfer image capture devices 180 from the deposit component 316 to one or more of the error component 320 and the storage component 318. The return conveyor 324 may include one or more of a conveyor belt, a screw, a mechanical arm, a roller conveyor, a zero pressure conveyor, a minimum pressure conveyor, a pneumatic conveyor, a drag chain, a table top chain, or any other suitable mechanical device capable of transferring an image capture device 180 from the deposit component 316 to the error component 320 or the storage component 318.

Similar to the embodiments described above for the return conveyor 324, the dispensing conveyor 326 is a motive element extending between or effectively coupling the storage component 318 and the provision component 314. In some embodiments, the dispensing conveyor 326 may be similar to or the same as the return conveyor 324, a motive element using one or more types of conveyors to transfer an image capture device 180 for dispensing through the provision component 314 of the dispersal machine 170. In some instances, the dispensing conveyor 326 may be a non-motive element configured to transfer the image capture device 180 without performing work on said image capture device 180. In some such instances, the dispensing conveyor 326 may define an inclined path extending from the storage component 318 to the provision component 314. Where the dispensing conveyor 326 defines an inclined path, the dispensing conveyor 326 may act as a chute sized and shaped to enable an image capture device 180 to slide from the storage component 318 to the provision component 314 once the image capture device 180 is selected or designated for distribution from the dispersal machine 170.

In some embodiments, the display component 328 comprises a display device configured to cause presentation of a graphical user interface visible within or proximate to at least a portion of the housing 310. In some embodiments, the housing 310 defines an opening corresponding to the display component 328. The display component 328 may be one or more of a liquid crystal display (LCD), a light-emitting diode (LED) display, an organic light-emitting diode (OLED) display, a touchscreen, or any other suitable component configured to present information in a visibly perceivable form. The display component 328 may be positioned within the opening defined by the housing 310 or proximate thereto. For example, the display component 328 may be placed in a recessed position behind and visible through the opening defined within the housing 310.

In some embodiments, at least a portion of the display component 328 is physically accessible through the opening, such as in embodiment employing a touchscreen. The display component 328 may be electrically coupled to at least one of a processor and a memory such that information representing an inventory of image capture devices 180 stored within the storage component 318 may be displayed on the display component 328. The display component 328 may further display communications information enabling transmission of media instances from a recently returned image capture device for publication in a designated media distribution session. For example, the display component 328 may display selectable elements or icons configured to select and cause dispensing of an image capture device 180, return an image capture device 180, transmit media instances (e.g., image data, audio data, or video data) to the media distribution system 160 for publication within media distribution sessions, process transactions for distribution and return of the image capture devices 180, and any other suitable communications information.

In some embodiments, the display component 328 is configured to display selectable elements configured to enable user interaction with the dispersal machine 170. The selectable elements may include icons, data entry elements, and any other suitable elements presented within a graphical user interface. Data entry elements may comprise a virtual or graphical keyboard, ideograms, or any other suitable data entry elements. In some instances, the data entry elements may be distinct from the display component 328. For example, the data entry elements may comprise one or more of a physical keyboard, a track pad, a touch pad, buttons, or any other suitable physical elements with which a user may interact with the dispersal machine 170.

The communications component 330 is configured to transmit information from the dispersal machine 170 to one or more of the media distribution system 160 and the messaging system 130. The communications component 330 may comprise one or more transceivers, I/O components, WI-FI® components, or other communication components enabling communication across one or more networks (e.g., the network 104) connecting the dispersal machine 170, the media distribution system 160, and the messaging system 130. As explained in more detail below, the communications component 330 may enable communication of identifiers, device codes, media instances, and any other suitable data from the dispersal machine 170.

Figure 4:
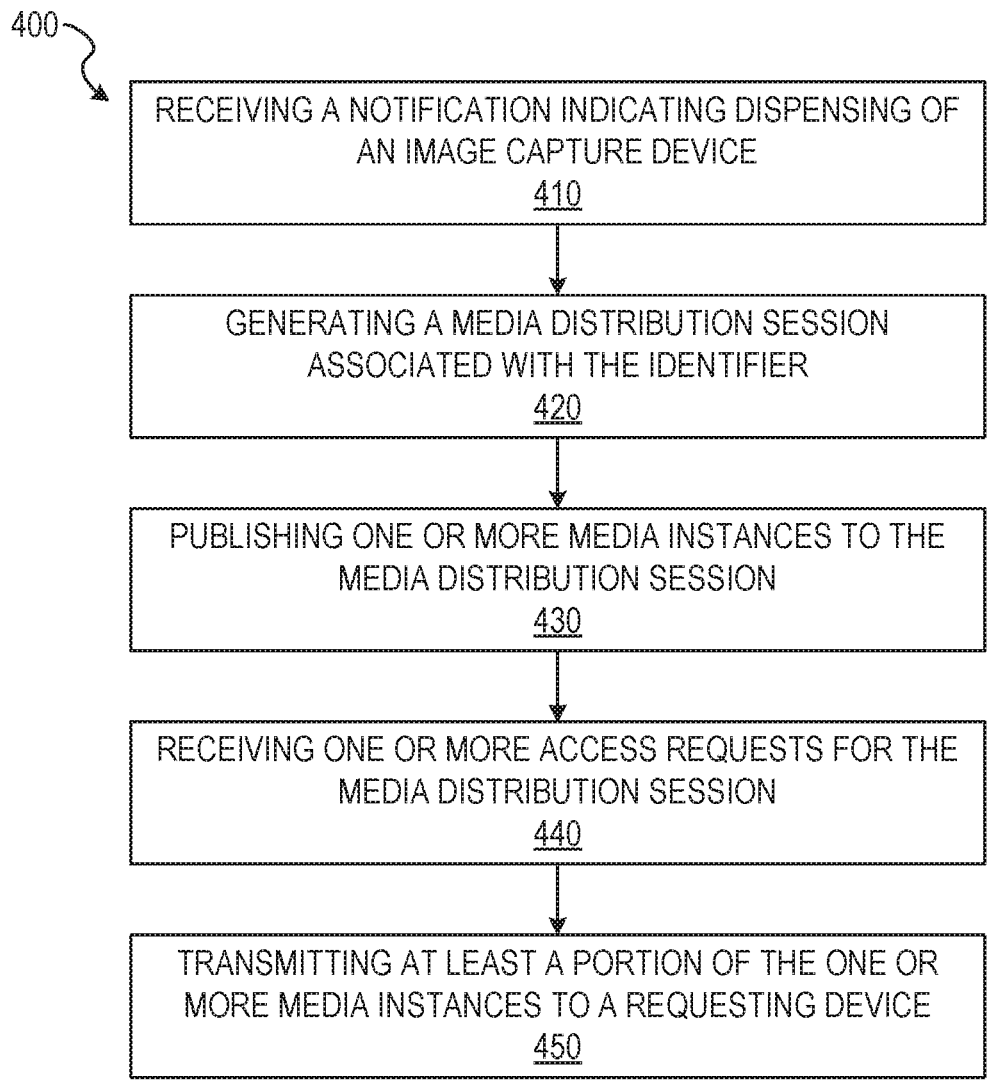
FIG. 4 is a flow diagram illustrating an example method for distributing audio/visual media within a networked system, according to some example embodiments.

FIG. 4 depicts a flow diagram illustrating an example method 400 for distributing audio/visual media within a networked system. The operations of method 400 may be performed by components of the media distribution system 160, and are so described below for purposes of illustration. Distribution of the media may be performed in cooperation with the messaging system 130 such that devices associated with users of the messaging system 130 may access and view the audio/visual media via a network.

In operation 410, the access component 210 receives a notification indicating dispensing of an image capture device (e.g., the image capture device 180) by the dispersal machine 170. The notification may comprise an identifier associated with the image capture device 180. In some embodiments, the access component 210 receives the notification via the network 104. The notification may be transmitted to the access component 210 by the dispersal machine 170, the client device 110, a combination thereof, or any other machine or device having access to data indicating the dispensing of the image capture device 180. The notification may include one or more of an identifier, an identifier for the image capture device 180, an identifier for the client device 110, an identifier for the dispersal machine 170, a device code for the client device 110, a time stamp, location information (e.g., a geographic location of the client device 110 or the dispersal machine 170), or any other suitable information relating to dispersal of the image capture device 180.

In some embodiments, the notification received by the access component 210 is generated based on a dispensing request. The dispensing request is generated by accessing a social messaging application, described in more detail below. A user may open the social messaging application and select one or more user interface elements. Based on the one or more selections and a location of the user, the social messaging application may identify and display locations of one or more dispersal machines within a suitable distance from the user. In some embodiments, the social messaging application presents the locations of the one or more dispersal machines on a graphical user interface comprising a map. If no dispersal machines are in a suitable distance, the social messaging application may be configured to provide push notifications to a mobile computing device (e.g., a client device) of the user when a dispersal machine is in range or an image capture device is available for distribution. In some embodiments, the social messaging application enables selection and reservation of an image capture device at a specified dispersal machine. The social messaging application and push notifications may also present directions to guide the user to the dispersal machine with the reserved or available image capture device.

In operation 420, the session component 220 generates a media distribution session associated with the identifier. In some embodiments, the session component 220 generates the media distribution session in response to receiving the notification of dispensing the image capture device 180. The media distribution session may be a user session, a temporary user account, a persistent account, a data structure, a webpage, a uniform resource locator (URL), or any other definable destination capable of receiving and enabling access to the media or data captured by the image capture device 180.

In some embodiments, the session component 220 pairs a social media account of a user with an identifier for one or more of the media distribution session or the image capture device 180. For example, the session component 220 may pair a user's account with a QR code or other identifier (e.g., via a wireless connection or a pre-paired association resulting from a previous reservation of the image capture device 180). Once the session component 220 generates the media distribution session and associates the media distribution session with the user account, the dispersal machine 170 may detect the user is within a suitable distance from the machine, using Near Field Communication or BLUETOOTH® Low Emissions communications, and automatically dispense the image capture device based on the identified proximity or in response to a combination of proximity and insertion of a payment method. Upon distribution of the image capture device 180, the user or the user's account may be presented or otherwise notified of a serial number, barcode, QR code, or other identifier of one or more of the media distribution session and the image capture device 180. The user may then scan or otherwise enter the identifier into the social messaging application running on the client device of the user. The client device may then contact a server associated with the social messaging application or the dispersal machine 170 to confirm receipt of the image capture device 180.

In operation 430, the publication component 230 publishes one or more media instances to the media distribution session by associating the media distribution session and the identifier with the one or more media instances. The publication component 230 may publish the one or more media instances to the media distribution session by associating or otherwise assigning the one or more media instances to the media distribution session. Assignment or association of the one or more media instances to the media distribution session enables access of the one or more media instances through interaction with the media distribution session. For example, where the media distribution session is a temporary social messaging account, a client device 110 may access the temporary social messaging account to cause transmission and display of the one or more media instances at the client device 110.

The publication component 230 may publish, associate, or assign the one or more media instances to the media distribution session in any suitable manner. In some embodiments, the publication component 230 may publish the one or more media instances to the media distribution session by storing the one or more media instances at a database or data structure location associated with the media distribution session. For example, the publication component 230 may store the one or more media instances in a database at a disk location associated with or allocated to the media distribution session. In some instances, the publication component 230 publishes the one or more media instances to the media distribution session by performing a file transfer of the one or more media instances to a network address of the media distribution session. Although described with specific embodiments and examples, it should be understood that the publication component 230 may publish the one or more media instances to the media distribution session in any suitable manner.

In some embodiments, the publication component 230 publishes the one or more media instances to the media distribution session in response to receiving a set of media instances from one or more machine. The set of media instances may include the one or more media instances. The set of media instances may be received as a batch, in a plurality of batches, in succession (e.g., each media instance may be received separately and responsive to capturing of the specified media instance), or in any other suitable manner. In some instances, the set of media instances is received from the dispersal machine 170. Where the set of media instances is received from the dispersal machine 170 and in a batch or set of batches, the set of media instances may be received responsive to the dispersal machine 170 receiving the image capture device 180 at a time subsequent to dispensing the image capture device 180.

In operation 440, the access component 210 receives one or more access requests for the media distribution session. In some embodiments, the one or more access requests include the identifier and an indication of a requesting device. The requesting device may receive a network location, an identifier, or any other suitable information for the media distribution session and transmit the access request, including at least a portion of the media distribution session information, to the access component 210. Upon receiving the one or more access requests, the access component 210 may determine a user permission for each access request. In some instances, prior to providing access to the media distribution session, the access component 210 may determine the user permission is associated with the media distribution session. Once the user permission is verified, the access component 210 may pass a validation token to the communication component 240 indicating verified access by the requesting device to the media distribution session.

In operation 450, the communication component 240 transmits at least a portion of the one or more media instances to the requesting device. In some embodiments, the communication component 240 transmits the one or more media instances, or portions thereof, in response to the one or more access requests. The communication component 240 may transmit the portion of the one or more media instances to the requesting device by transferring one or more media files, or copies thereof, to the requesting device via the network 104. In some instances, the communication component 240 transmits a network location, address, or other locating information to the requesting device, so that the requesting device may then directly access a specified media instance. In some embodiments, the communication component 240 transmits the one or more media instances to the requesting device, such that the one or more media instances are, at least temporarily, stored at the requesting device (e.g., stored in random access memory (RAM)). The communication component 240 may transmit selected media instances from the one or more media instances of the media distribution session, a subset of the one or more media instances, or all of the one or more media instances associated with the media distribution session. Once the media instance, media instances, or location information has been received by the requesting device, the requesting device may cause presentation of at least one of the one or more media instances within a graphical user interface displayed on a display component of the requesting device.

Figure 5:
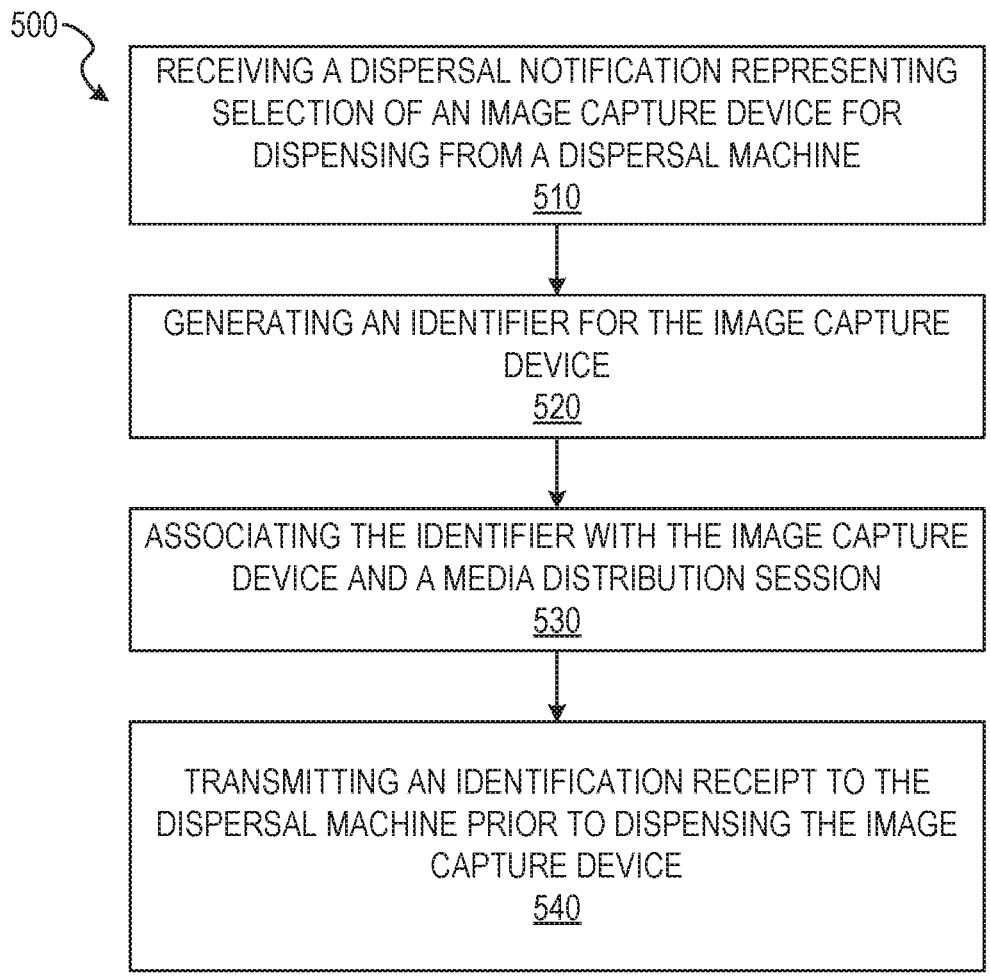
FIG. 5 is a flow diagram illustrating an example method for distributing audio/visual media within a networked system, according to some example embodiments.

FIG. 5 depicts a flow diagram illustrating an example method 500 for distributing audio/visual media within a networked system. The operations of method 500 may be performed by components of the media distribution system 160. In some instances, certain operations of the method 500 may be performed using one or more operations of the method 400 or as sub-operations of one or more operations of the method 400, as will be explained in more detail below.

In operation 510, the access component 210 receives a dispersal notification representing selection of an image capture device 180 for dispensing by the dispersal machine 170. The dispersal notification may include a device code for the image capture device 180. For example, the device code may be a serial number, a barcode, or any other suitable identification for the image capture device 180. In some embodiments, the access component 210 receives the dispersal notification from the dispersal machine 170. The dispersal machine 170 may receive a selection to dispense the image capture device 180. The selection may be representative of a user interaction with an icon or other selectable element within a graphical user interface presented at the dispersal machine 170. In some instances, selection may be representative of a user interaction with a physical selectable element (e.g., a button) on the dispersal machine 170. Upon receiving the user selection, the dispersal machine 170 may generate the dispersal notification and transmit the dispersal notification to the access component 210.

In operation 520, the identification component 250 generates the identifier for the image capture device 180. Upon receiving the dispersal notification, the identification component 250 may generate the identifier as a unique identification by which users may access media instances from the image capture device 180. In some embodiments, the identification component 250 generates the identifier using one or more random character generation operations. For example, the identification component 250 may generate a string of random numbers, a string of random letter, a string of random characters, or combinations thereof. In some instances, the identification component 250 generates the identifier from the device code. For example, the identification component 250 may perform one or more hash functions, derivation functions, encoding functions, encryption functions, or any other suitable operations to generate the identifier from the device code.

In operation 530, the identification component 250 associates the identifier with the image capture device 180 and the media distribution session. In some embodiments, the identification component 250 associates the identifier with the media distribution session by assigning the identifier to a previously or newly generated media distribution session. The identification component 250 may associate the identifier with the media distribution session by inserting the identifier into metadata for the media distribution session or within one or more portion of the media distribution session. In some embodiments, the identification component 250 inserts the device code for the image capture device 180 into one or more of the metadata or a portion of the media distribution session along with the identifier. The identifier may be associated or assigned to the media distribution session for a period of time. When the period of time elapses, the identification component 250 may remove the identifier from the media distribution session and assign or associate another identifier or image capture device 180 with the media distribution session.

In operation 540, the communication component 240 transmits an identification receipt to the dispersal machine prior 170 to the dispersal machine 170 dispensing the image capture device 180. In some embodiments, the identification receipt includes the identifier. The identification receipt may be configured to be displayed at the dispersal machine 170 contemporaneous with the dispensing of the image capture device 180. In some instances, the identification receipt may be transmitted and displayed on a display device associated with the image capture device 180 (e.g., a touch or view screen on a camera).

Figure 6:
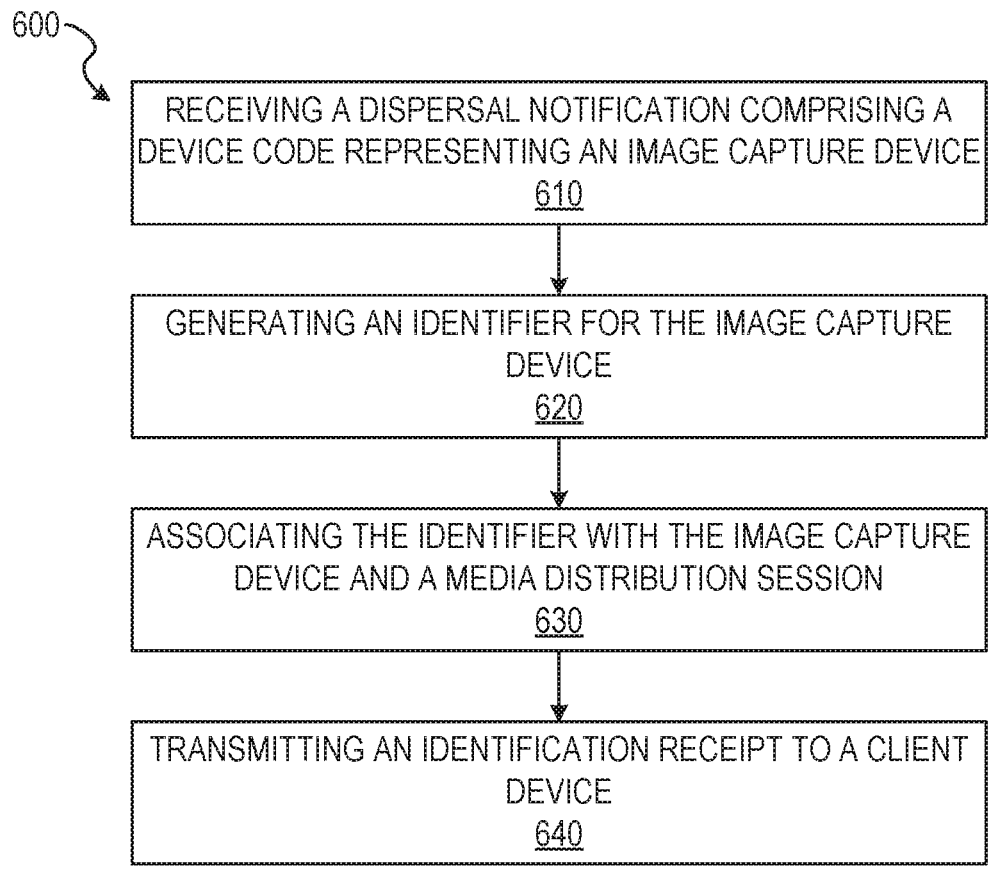
FIG. 6 is a flow diagram illustrating an example method for distributing audio/visual media within a networked system, according to some example embodiments.

FIG. 6 depicts a flow diagram illustrating an example method 600 for distributing audio/visual media within a networked system. The operations of method 600 may be performed by components of the media distribution system 160. In some instances, certain operations of the method 600 may be performed using one or more operations of the method 400 or the method 500, or as sub-operations of one or more operations of the method 400 or the method 500, as will be explained in more detail below.

In operation 610, the access component 210 receives a dispersal notification comprising a device code representing the image capture device 180. As described above with respect to operation 510, the device code may be a serial number, a barcode, or any other suitable identification for the image capture device 180. The dispersal notification may be received by the access component 210 from the client device 110. For example, once the dispersal machine 170 dispenses the image capture device 180, a user may locate the device code for the image capture device 180. The device code may be placed on a visible portion of the image capture device 180, such as a serial number, a numerical code, an alphanumeric code, or any other suitable image code. In some instances, the device code may be displayed on a display component of the image capture device 180. In such instances, the user may initiate operation of the image capture device 180 by turning on the image capture device 180. Once operable, the image capture device 180 may display the image code on the display device.

Once the device code has been displayed, on the image capture device 180 or on the display component, the user may enter the device code into a graphical user interface presented on a display component of the client device 110. For example, the graphical user interface may be a part of a messaging app configured to present media instances published to media distribution sessions. In some embodiments, the messaging app is configured to receive the image code and generate a dispersal notification. The user may select a code entry icon, responsive to which the messaging app may present a code entry field (e.g., a text entry field, a barcode scanner, etc.). In some instances, the user opens the messaging app and an image capture mode within the messaging app. The user may then position the device code within a field of view depicted within the image capture mode and select an icon causing the image capture device 180 of the client device 110 to capture image data for the device code. Upon capturing image data for the device code, the messaging app may generate the dispersal notification and transmit the dispersal notification to the access component 210.

In operation 620, the identification component 250 generates the identifier for the image capture device 180. Upon receiving the access component 210, the dispersal notification is passed to the identification component 250. The identification component 250 may generate the identifier as a unique identification by which users may access media instances from the image capture device 180. The identifier may be an independently generated string (e.g., a string containing random numbers, letters, alphanumeric characters, symbols, or other suitable string), a string generated from the device code, or any other suitable identifier.

In operation 630, the identification component 250 associates the identifier with the image capture device 180 and the media distribution session. Once the identifier has been generated, the identification component 250 may associate the identifier with the media distribution session in a manner similar to or the same as described above with respect to operation 530. For example, the identification component 250 may associate the identifier with the media distribution session by assigning the identifier to an existing media distribution session, storing the identifier in metadata for the media distribution session. The identification component 250 may also associate the identifier with a newly generated media distribution session created upon one or more of receipt of the dispersal notification and generation of the identifier.

In operation 640, the communication component 240 transmits an identification receipt to the client device 110. The identification receipt may include the identifier. In some instances, the communication component 240 transmits the identification receipt in response to receiving the dispersal notification from the client device 110. The communication component 240 may transmit the identification receipt in a manner similar to that described above with respect to operation 540. In some embodiments, the identification receipt may be configured to be displayed on a display component of the client device 110 upon being received. For example, once the client device 110 receives the identification receipt, the messaging app may cause the client device 110 to display one or more of the received identifier or an identification for the media distribution session. In some embodiments, the messaging app causes the client device 110 to generate one or more graphical user interface screens indicating that the image capture device 180 is ready for use, and images, audio data, video data, or other media captured or generated by the image capture device 180 may be viewed or consumed at a network address or app location of the media distribution session once the captured or generated data has been uploaded from the image capture device 180.

Figure 7:
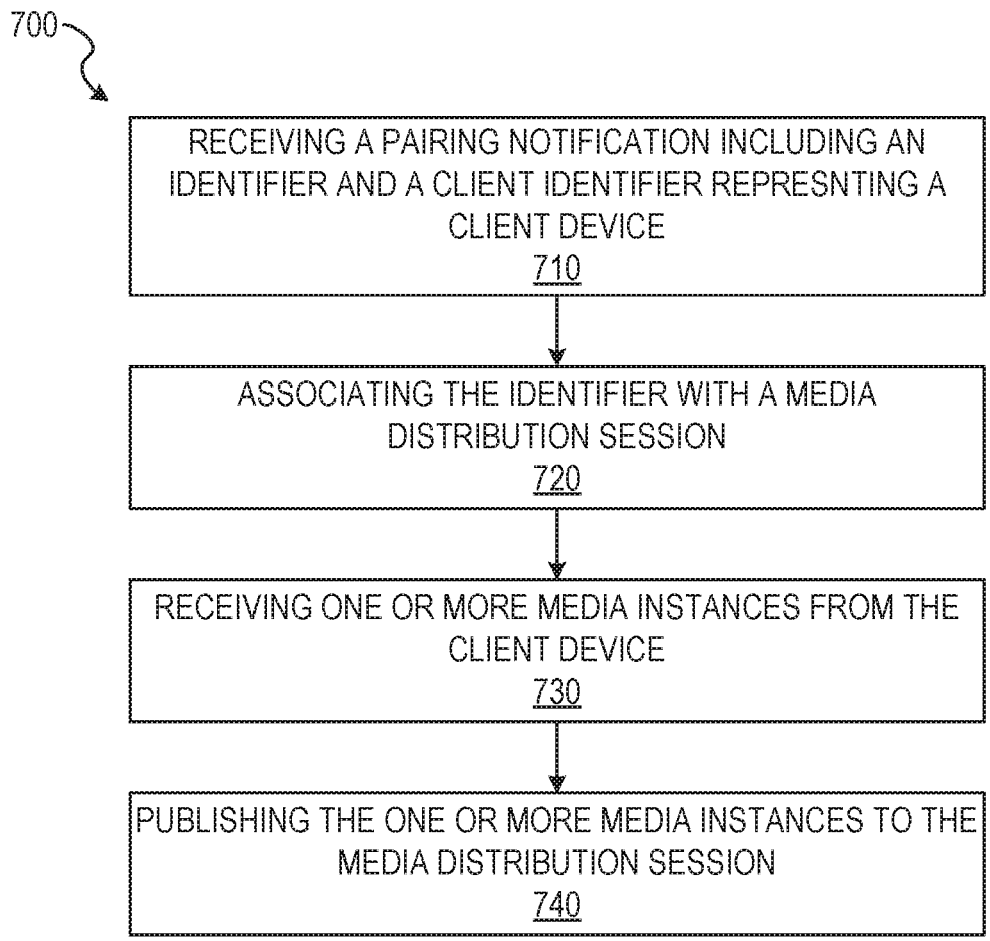
FIG. 7 is a flow diagram illustrating an example method for distributing audio/visual media within a networked system, according to some example embodiments.

FIG. 7 depicts a flow diagram illustrating an example method 700 for distributing audio/visual media within a networked system. The operations of method 700 may be performed by components of the media distribution system 160. In some instances, certain operations of the method 700 may be performed using one or more operations of the methods 400, 500, or 600, or as sub-operations of one or more operations of the methods 400, 500, or 600, as will be explained in more detail below.

In operation 710, the access component 210 receives a pairing notification including an identifier and a client identifier representing the client device 110. In some embodiments, the identifier is an identifier of the image capture device 180. The pairing notification indicates the image capture device 180 is linked, at least temporarily, with the client device 110. The pairing notification may also include a pairing time, a countdown for a predetermined period of time initiated at the pairing time, and any other suitable information about the pairing or the dispersal of the image capture device 180. For example, the client device 110 and the image capture device 180 may be linked or paired by a wireless communication connection (e.g., an ad hoc network connection, a BLUETOOTH® connection, or any suitable wireless connection), a wired connection, or any suitable connection configured to enable data transmission between the image capture device 180 and the client device 110. Once established, the pairing between the image capture device 180 and the client device 110 triggers one or more of the image capture device 180 and the client device 110 to generate the pairing notification and transmit the pairing notification to the access component 210.

In operation 720, the identification component 250 associates the identifier with the media distribution session. The identifier may be associated with the media distribution session in a manner similar to or the same as described above with respect to operations 530 or 630. For example, the identification component 250 may associate the identifier by storing the identifier in metadata for a previously generated media distribution session or a newly generated media distribution session.

In operation 730, the access component 210 receives the one or more media instances from the client device 110. In some embodiments, the one or more media instances include the identifier and a device code representing the client device 110. For example, the image capture device 180 may transmit one or more media instances, to the access component 210 through the client device 110. The image capture device 180, upon capturing image data for a media instance, may pass the image data to the client device 110 via the pairing connection between the client device 110 and the image capture device 180. Upon receipt of the image data, the client device 110 transmits the image data to the publication component 230 or the communication component 240 for publication to the media distribution session. In some instances, the client device 110 packages the one or more media instance with one or more of the identifier, the device code, and an identification for the media distribution session. Once the one or more media instances are configured, the client device 110 transmits the one or more media instances to the access component 210.

In operation 740, the publication component 230 publishes the one or more media instances to the media distribution session responsive to receiving the one or more media instances from the client device 110. The publication component 230 may publish the one or more media instances to the media distribution session in a manner similar to or the same as described above with respect to operation 530. In some instances, the publication component 230 publishes each successive media instance received, by the access component 210, from the client device 110. The publication component 230 may also publish the media instances received from the client device 110 in batches. For example, the publication component 230 may publish the one or more media instances received from the client device 110 at set publication times, upon receiving a suitable or predetermined number of media instances (e.g., exceeding a threshold for a number of media instances or a total storage size of the media instances), upon detecting a network throughput speed, or upon identifying any other suitable metric.

Figure 8:
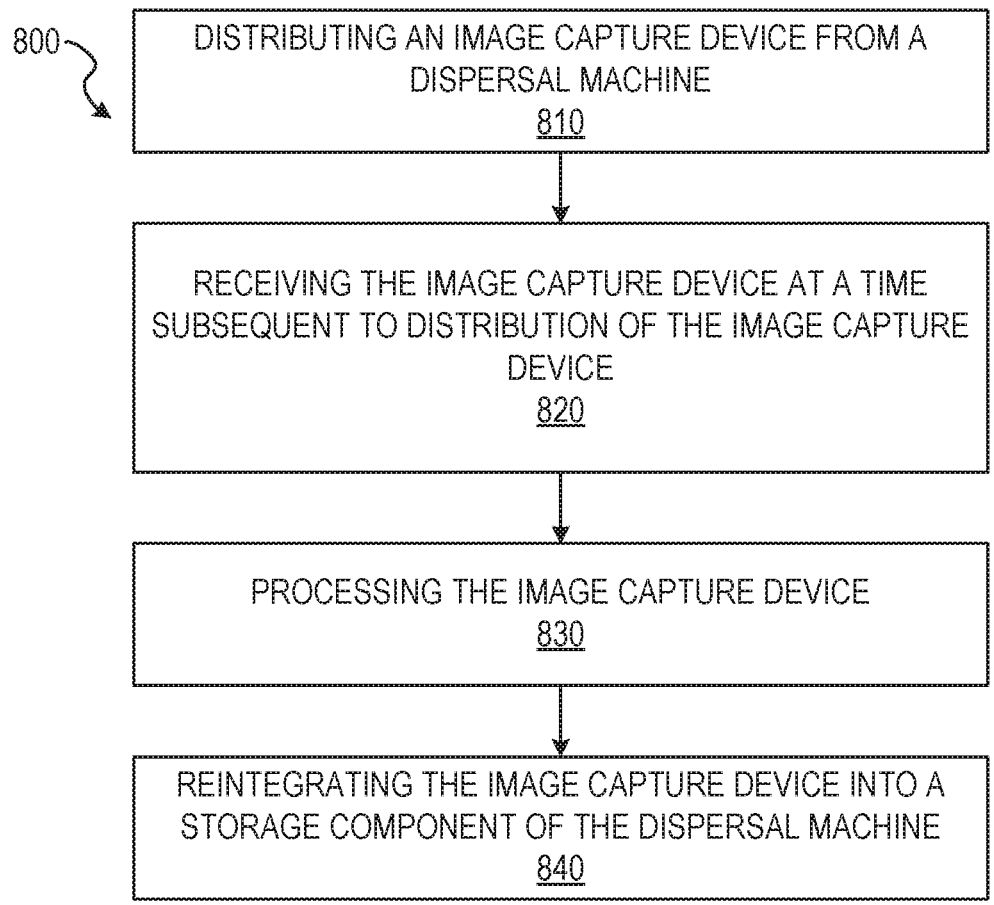
FIG. 8 is a flow diagram illustrating an example method for distributing image capture devices from a dispersal machine, according to some example embodiments.

FIG. 8 depicts a flow diagram illustrating an example method 800 for dispersing or distributing one or more image capture devices 180 from the dispersal machine 170. The operations of method 800 may be performed by components of the dispersal machine 170. In some instances, certain operations of the method 800 may be performed using or in cooperation with one or more operations of the methods 400, 500, 600, or 700, or as sub-operations of one or more operations of the methods 400, 500, 600, or 700, as will be explained in more detail below.

In operation 810, the provision component 314 distributes an image capture device (e.g., the image capture device 180). The image capture device may be distributed from the dispersal machine 170, such that a user or operator of the dispersal machine 170 may retrieve or otherwise be provided with access to the image capture device. In some embodiments, the dispersal machine 170 is configured to present one or more selections on a graphical user interface displayed on the display component 328. The one or more selections may be represented by one or more selectable elements or icons positioned about the graphical user interface. In some embodiments, various selectable elements or icons are associated with image capture devices contained within the storage component 318. Each selectable element or icon may correspond to a differing image capture device, a type of image capture device, or aspects of image capture devices stored within the storage component 318.

After presentation on the display component 328, the dispersal machine 170 may receive selection of an element or icon representative of an image capture device. Responsive to receiving the selection, one or more of the storage component 318 and the provision component 314 select an image capture device within the storage component 318 corresponding to the selection. The storage component 318 and the provision component 314 cooperate to retrieve the selected image capture device 180 from the storage component 318 and transfer the selected image capture device 180 from a position within the storage component 318 and into the dispensing bin of the provision component 314. The dispensing conveyor 326 may be engaged to transfer the selected image capture device from the storage component 318 to the provision component 314. The user may retrieve the image capture device 180 at a first time and capture or otherwise generate one or more media instances or content.

In operation 820, the deposit component 316 receives the image capture device. In some embodiments, the image capture device is received at a time subsequent to distributing the image capture device (e.g., the first time). The selected image capture device may be placed into the receiving bin of the deposit component 316. In some embodiments, the deposit component 316 detects a presence of the image capture device within the receiving bin. When the image capture device is determined to be within the receiving bin, the return conveyor 324 is engaged to transfer the image capture device from the receiving bin of the deposit component 316 to the error component 320. In some embodiments, the return conveyor 324 transfers or otherwise conveys the image capture device from the receiving bin and positions the image capture device within the diagnostic bay of the error component 320.

In operation 830, the error component 320 processes the image capture device. Once the image capture device 180 is positioned within the diagnostic bay, the error component 320 may perform one or more diagnostic operations, one or more calibration operations, one or more cleaning operations, or any other suitable processing to verify that the image capture device is in working order and ready for placement into the storage component 318 for subsequent distribution by the dispersal machine 170. As will be explained in more detail below, in some embodiments, the error component 320 positions the image capture device in the diagnostic bay in an orientation such that a field of view of an imaging sensor of the image capture device includes at least a portion of the calibration surface.

In some embodiments, the error component 320 or one or more processors of the dispersal machine 170, control one or more aspects, settings, parameters, or other programmable features of the image capture device to calibrate or otherwise modify features of the image capture device. The error component 320, or the one or more processors of the dispersal machine 170, may modify the features of the image capture device to correct calibration or other errors detected within the image capture device while within the diagnostic bay of the error component 320. In some instances, the error component 320 performs component replacement of damaged, dirty, or non-functional components of the image capture device upon determining an error which may not be corrected through data transfer, calibration, or reprogramming operations.

In operation 840, error component 320 and the storage conveyor 322 reintegrate the image capture device into the storage component 318 of the dispersal machine 170. In some embodiments, the storage conveyor 322 retrieves the image capture device from the diagnostic bay of the error component 320. The storage conveyor 322 may retrieve the image capture device by contacting the image capture device 180. For example, the storage conveyor 322 may transfer the image capture device by movement of a conveyor, a mechanical arm, or any other suitable physical operation. Once in contact with the image capture device, the storage conveyor 322 may transfer the image capture device to the storage component 318. In instances where the image capture device is suitable for redistribution from the provision component 314, the storage conveyor 322 may transfer the image capture device into a first portion of the storage component 318 associated with image capture devices available for circulation. In instances where the image capture device is determined to be inoperable or otherwise ill-suited for circulation, the storage conveyor 322 may transfer the image capture device into a second portion of the storage component 318. The second portion of the storage component 318 may be a damaged device receptacle configured to contain and store damaged, nonfunctional, or otherwise unsuitable image capture devices for retrieval and disposal from the dispensing machine 170.

Figure 9:
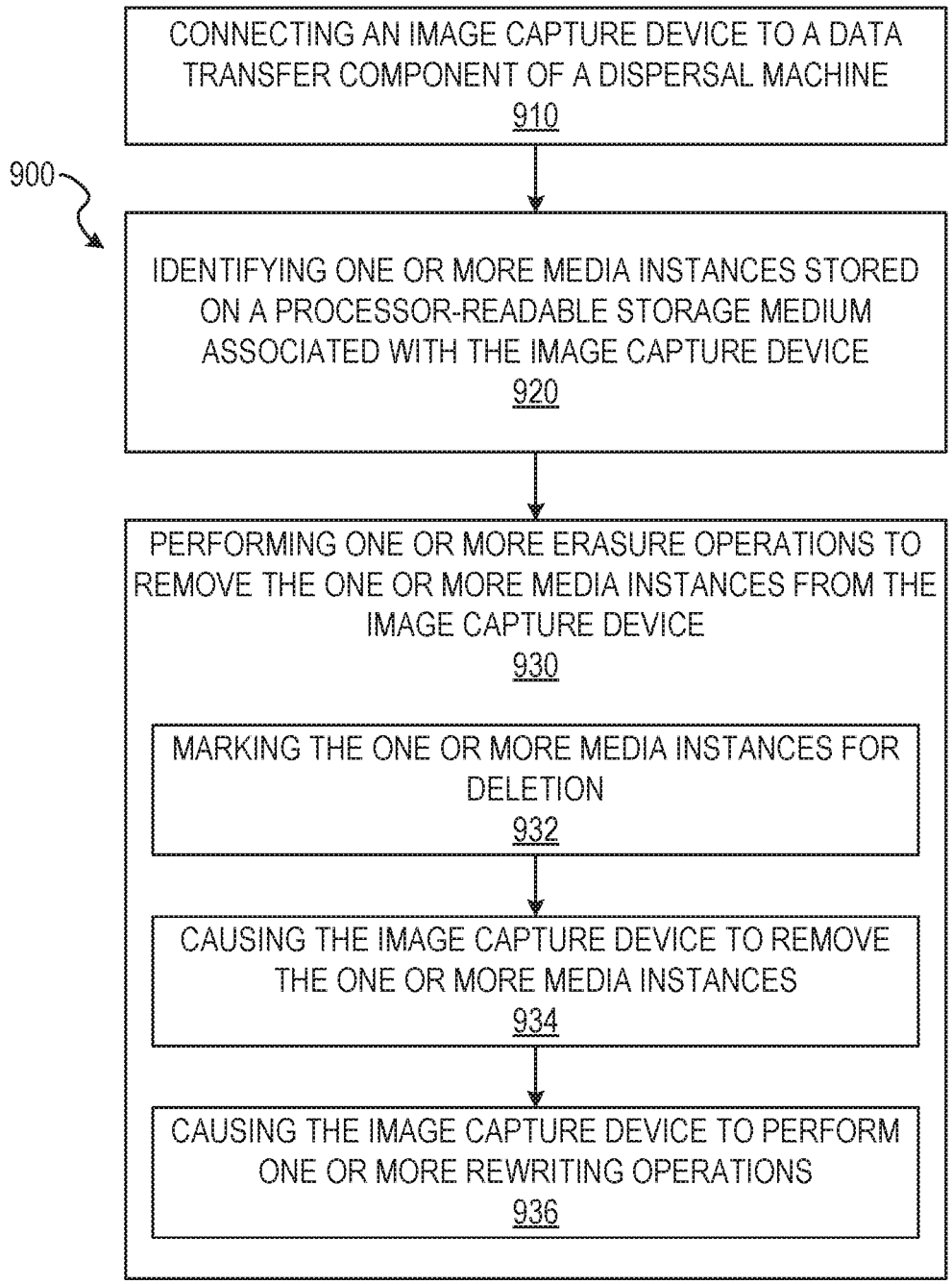
FIG. 9 is a flow diagram illustrating an example method for processing an image capture device within a dispersal machine, according to some example embodiments.

FIG. 9 depicts a flow diagram illustrating an example method 900 for processing an image capture device (such as the image capture device 180) by the dispersal machine 170. The operations of method 900 may be performed by components of the dispersal machine 170. In some instances, certain operations of the method 900 may be performed using or in cooperation with one or more operations of the method 800 or as sub-operations of one or more operations of the method 800 as will be explained in more detail below.

In operation 910, the error component 320 connects the image capture device to a data transfer component of the dispersal machine 170. Connection to the data transfer component may enable transfer of captured images stored on the image capture device prior to repair, error correction, or other operations. The captured images may also be transferred via any suitable wireless or wired protocol. Upon transfer of the captured images (e.g., transferring the captured images to a distribution session) and connection to the data transfer component, the captured images may be removed (e.g., erased or wiped) from the image capture device prior to diagnostic or other operations performed on the image capture device. In some embodiments, the return conveyor 324 transports the image capture device from the deposit component 316 to the error component 320. The return conveyor 324 may deposit the image capture device in the diagnostic bay of the error component 320. In some instances, the return conveyor 324 deposits the image capture device in a specified orientation and position within the diagnostic bay. The diagnostic bay may be configured to guide the positioning of the image capture device to a specified position and orientation within the diagnostic bay relative to the calibration surface. In some embodiments, when positioned within the diagnostic bay, the image capture device makes contact or otherwise connects with a physical connector of the data transfer component. The connector of the data transfer component may connect to one or more of a charging port or data transfer port of the image capture device.

In some embodiments, the data transfer component includes one or more wireless communication elements. The return conveyor 324 may transport and deposit the image capture device to the diagnostic bay of the error component 320. Once the image capture device is detected within the diagnostic bay, a wireless transceiver (e.g., a wireless communication element of the data transfer component) initiates connection to a communication component of the image capture device. In some embodiments, the data transfer component may wirelessly connect to the image capture device via a BLUETOOTH® or WI-FI® network connection.

In operation 920, the error component 320 identifies one or more media instances stored on a processor-readable storage medium associated with the image capture device. One or more processors of the error component 320 or operating in conjunction with the error component 320 may identify the one or more media instances within the image capture device by accessing one or more data structures defined within the processor-readable storage medium. The one or more processors may identify the one or more media instances from other data stored on the processor-readable storage medium, such as image capture software, user interface software, firmware, and other data.

In operation 930, the error component 320 performs one or more erasure operations to remove the one or more media instances from the processor-readable storage medium of the image capture device. Upon identifying the one or more media instances, the error component 320 may initially select the one or more media instances for erasure or other deletion operation. The one or more processors may then cause the image capture device to erase the selected or designated one or more media instances. In some instances, in response to erasing the designated one or more media instances, the error component 320 performs one or more validation operations to verify the designated one or more media instances no longer exist within the processor-readable storage medium of the image capture device.

In some embodiments, the erasure operations include one or more sub-operations to remove the one or more media instances by marking the one or more media instances for deletion within the processor-readable storage medium in operation 932. For example, the one or more processors may modify a tag, metadata element, or portion of the data comprising the one or more media instances to designate the one or more media instances for deletion. Once marked for deletion, the one or more processors may proceed to operation 934.

In operation 934, the error component 320 causes the image capture device to remove the designated one or more media instances which have been marked for deletion. In some embodiments, the one or more processors initially transfers the designated one or more media instances to a folder or data structure designated for data to be deleted. The one or more processors may then cause the image capture device to empty the folder or perform any other suitable housekeeping operations. In some instances, the erasure operations include one or more sub-operations which cause the image capture device to affirmatively remove the designated one or more media instances from the processor-readable storage device of the image capture device. For example, the one or more processors may cause the image capture device to erase a record indicating a storage location of the designated one or more media instances.

In operation 936, the error component 320 causes the image capture device to perform one or more rewriting operations on the processor-readable storage medium. In some embodiments, the error component 320, or the one or more processors, causes the image capture device to rewrite data structures or one or more locations on the processor-readable storage medium associated with the designated one or more media instances. The one or more processors may cause the image capture device to rewrite or overwrite the data structures or the one or more locations with data distinct from the designated media instances. In some instances, the rewrite or overwrite data comprises a single value (e.g., all ones or all zeroes), a plurality of values (e.g., a predetermined pattern of values or random values), or any other suitable data which replaces values representing the designated one or more media instances. In some embodiments, rewriting or overwriting may be performed such that all data is removed from the image capture device, all bits in a storage device or memory of the image capture device may be overwritten with zeroes, then overwritten with ones. Such overwriting procedures may be performed a plurality of times to ensure removal and prevent data extraction from the image capture device.

Figure 10:
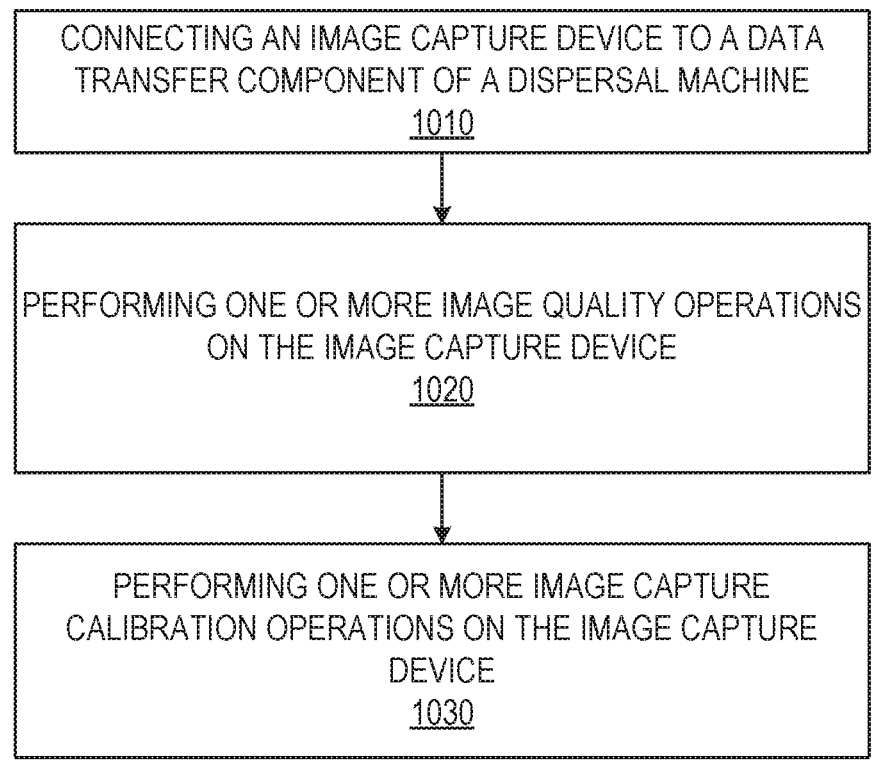
FIG. 10 is a flow diagram illustrating an example method for processing an image capture device within a dispersal machine, according to some example embodiments.

FIG. 10 depicts a flow diagram illustrating an example method 1000 for processing an image capture device (e.g., the image capture device 180) by the dispersal machine 170. The operations of method 1000 may be performed by components of the dispersal machine 170. In some instances, certain operations of the method 1000 may be performed using or in cooperation with one or more operations of the method 800 or as sub-operations of one or more operations of the method 800 as will be explained in more detail below.

In operation 1010, the error component 320 connects the image capture device to a data transfer component of the dispersal machine 170. In some embodiments, the data transfer component may be connected to or a portion of the error component 320. In some embodiments, the return conveyor 324 and the error component 320 connect the image capture device to the data transfer component in a manner similar to or the same as described above with respect to operation 910. The return conveyor 324 and the error component 320 may position the image capture device in the diagnostic bay of the error component 320 at a specified position and orientation, causing a field of view of the imaging sensor to include at least a portion of the calibration surface within the error component 320.

In some embodiments, the error component 320 performs one or more cleaning operations once the image capture device is received and/or positioned within the diagnostic bay. The error component 320 may clear particle debris from an exterior or interior of the image capture device 180. For example, the error component 320 may trigger an nozzle connected to a pressurized air supply or pressurizing device to spray, puff, or otherwise discharge a pressurized stream or burst of air to dislodge debris on the image capture device 180. In some embodiments, the error component 320 cleans a lens of the image capture device with one or more of a cleaning solution, a cleaning wipe, a stream of air, a burst of air, or any other suitable cleaning method.

In operation 1020, the error component 320 performs one or more image quality operations on the image capture device. In performing the image quality operations, the error component 320 may cause the imaging sensor of the image capture device to capture one or more of an image or video (e.g., a set of frames) of the calibration surface. For example, the image capture device 180 may be triggered to capture an image or video of the calibration surface in a uniform illuminated area, with a white or uniform light source. The image or video may be captured from a predetermined location and orientation within the diagnostic bay of the error component 320. In some embodiments, the image or video comprises a plurality of images captured using a plurality of settings, parameters, or filters of the image capture device or the imaging sensor. The plurality of settings, parameters, or filters may each be distinct from one another and cause modification to images captured or values within captured images of the calibration surface. The error component 320 may then compare the plurality of captured images to one or more test images of the calibration surface. The error component 320 may determine whether the plurality of images match expected colors, perspectives, dimensions, or other values or features of the one or more test images. Where the error component 320 detects a mismatch of at least one value or feature, the error component 320 determines one or more error. The error may be a calibration error, a parameter error, damage to the imaging sensor, damage to the image capture device, soiling of the image capture device, or other issue causing a shift in the values or features of the captured images from those of the test images. For example, the error component 320 may use the mismatch to detect a blemish on a camera lens, a dead pixel, a hot pixel, relative illumination, or any other suitable image capture abnormality.

In operation 1030, the error component 320 performs one or more image capture calibration operations on the image capture device. In some embodiments, the one or more image capture calibration operations are performed responsive to results of the one or more image quality operations described above with respect to operation 1020. The error component 320 may select an image capture calibration operation from a plurality of calibration operations. For example, the error component 320 may determine a type of error associated with the mismatch in values or features of the captured images, such as a dirty lens, an obstructed lens or zoom movement, a damaged lens, component damage to the image capture device (e.g., damage to a housing, a power source, a processor-readable storage medium, or any other component), a parameter change (e.g., a change of a setting or software parameter for capturing images), or any other detectable error, malfunction, or soiling. Once the type of error is determined, an image capture calibration operation may be selected corresponding to the type of error.

Once the image capture calibration operation is selected, the error component 320 performs the image capture calibration operation. For example, where the type of error is lens soiling, the error component 320 may perform an image capture calibration operation configured to clean or otherwise remove soiling from the lens. Where the error type is associated with a parameter or setting change to the image capture device, the error component 320 may modify the setting, restore the setting to a default value, restore all of the settings or parameters of the image capture device to default values, reinitialize one or more processor-executable instructions on the image capture device, format and reinstall processor-executable instructions, or otherwise correct the errant setting or parameter. Where the error type is a damaged or malfunctioning component of the image capture device, such as an image sensor, a lens, a housing, a power source, or a communication component, the error component 320 may attempt to recalibrate one or more component of the image capture device to circumvent or correct the mismatch of values or features. Although described with respect to specified operations, it should be understood that the error component 320 may perform any image calibration, initialization, reprogramming, or other calibration operation or operations capable of being performed within the dispersal machine 170 by one or more automated mechanical devices positioned within the housing 310.

Figure 11:
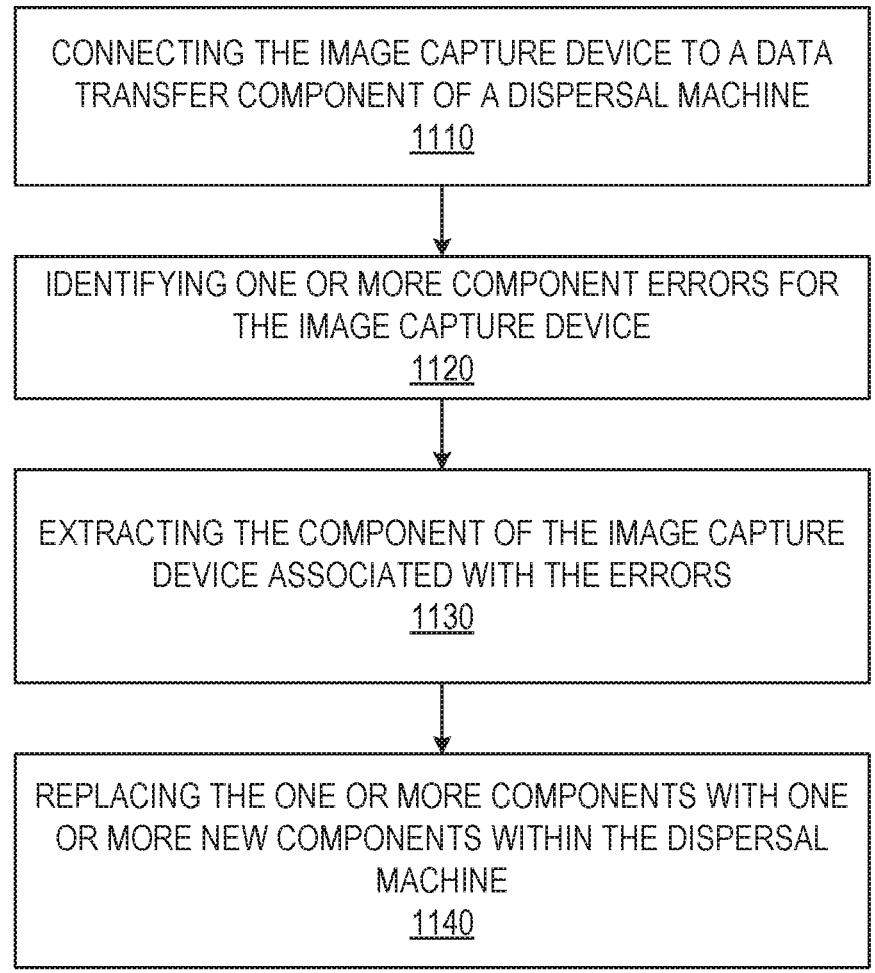
FIG. 11 is a flow diagram is a flow diagram illustrating an example method for processing an image capture device within a dispersal machine, according to some example embodiments.

FIG. 11 depicts a flow diagram illustrating an example method 1100 for processing an image capture device (e.g., the image capture device 180) by the dispersal machine 170. The operations of method 1100 may be performed by components of the dispersal machine 170. In some instances, certain operations of the method 1100 may be performed using or in cooperation with one or more operations of the method 800 or as sub-operations of one or more operations of the method 800 as will be explained in more detail below.

In operation 1110, the error component 320 connects the image capture device to a data transfer component of the dispersal machine 170. In some embodiments, the operation 1110 is performed in a manner similar to or the same as described above with respect to operations 910 and 1010. The error component 320 and the return conveyor 324 may position the image capture device at a position and orientation to capture images of the calibration surface. In some instances, the image capture device is positioned in the diagnostic bay at a position suitable to scan an exterior of the image capture device.

In operation 1120, the error component 320 identifies one or more component errors. In some embodiments, the one or more component errors are associated with one or more components of the image capture device. As described above with respect to operation 1020, the error component 320 may cause the image capture device to capture a plurality of images of the calibration surface and compare the plurality of images with one or more test images. The error component 320 may determine that an error or mismatch exists in the plurality of images. The error may be a calibration error, a parameter error, damage to the imaging sensor, damage to the image capture device, soiling of the image capture device, or other issue causing a shift in the values or features of the captured images from those of the test images. Where the error or mismatch is associated with damage to a component of the image capture device, the error component 320 may proceed to operation 1130. For example, the error component 320 may determine a type of error associated with the mismatch in the captured images, such as a dirty lens, an obstructed lens or zoom movement, a damaged lens, component damage to the image capture device (e.g., damage to a housing, a power source, a processor-readable storage medium, or any other component), or any other detectable error, malfunction, or soiling.

In operation 1130, error component 320 performs corrective operations on the component of the image capture device associated with the error. In some embodiments, the error component 320 cleans soiling or obstructions from the component. For example, where the type of error is lens soiling, the error component 320 may perform an image capture calibration operation configured to clean or otherwise remove soiling from the lens. The error component 320 may additionally clean or refurbish other damages to the image capture device which are cosmetic or otherwise unrelated to the error as a refurbishment process.

In some embodiments, the error component 320 extracts the one or more components of the image capture device. The extracted one or more components may be components of the image capture device associated with the one or more component errors. Where the error type is a damaged or malfunctioning component of the image capture device, such as an image sensor, a lens, a housing, a power source, or a communication component, the error component 320 may replace the malfunctioning or damaged component of the image capture device (e.g., an imaging sensor, a lens, etc.). Initially, the error component 320 may remove the damaged component. Removal of the damaged component may be performed by an ejection operation of the image capture device and triggered internally, within the image capture device, by the error component 320. In such instances, components may be configured to be removed or ejected without or with minimal external manipulation of the image capture device. In some embodiments, the error component 320 engages one or more motive elements, such as a robotic arm and grasping members to contact and extract the damaged component. Although described with respect to specified operations, it should be understood that the error component 320 may perform any image calibration, component replacement, cleaning, or repair operation or operations capable of being performed within the dispersal machine 170 by one or more automated mechanical devices positioned within the housing 310. Further, in some embodiments, the error component 320 may replace components based on reservations placed by users. The error component 320 may remove a lens or imaging sensor of a first type for a lens or imaging sensor of a second type. For example, where a user has reserved an image capture device 180 with a wide angle, fish-eye, or lowlight lens, the error component 320 may replace a lens of a returned image capture device with a suitable lens corresponding to the reservation.

In operation 1140, the error component 320 replaces the one or more components with one or more new components from a repair receptacle within the dispersal machine 170. In some instances, a repair member of the error component 320 may select a replacement component for the image capture device stored within a portion of the storage component 318. The repair member may transport the replacement component into the diagnostic bay of the error component 320 and insert, attach, or otherwise couple the replacement component in place of the extracted damaged component of the image capture device. Once the replacement component is coupled to the image capture device, the error component 320 may repeat or perform one or more image capture calibration operations, to validate the repair of the image capture device. Upon successful validation, the error component 320 and the storage conveyor 322 may transport the repaired image capture component to a suitable position within the storage component 318 to insert the image capture component back into circulation for redistribution from the provision component 314.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 12:
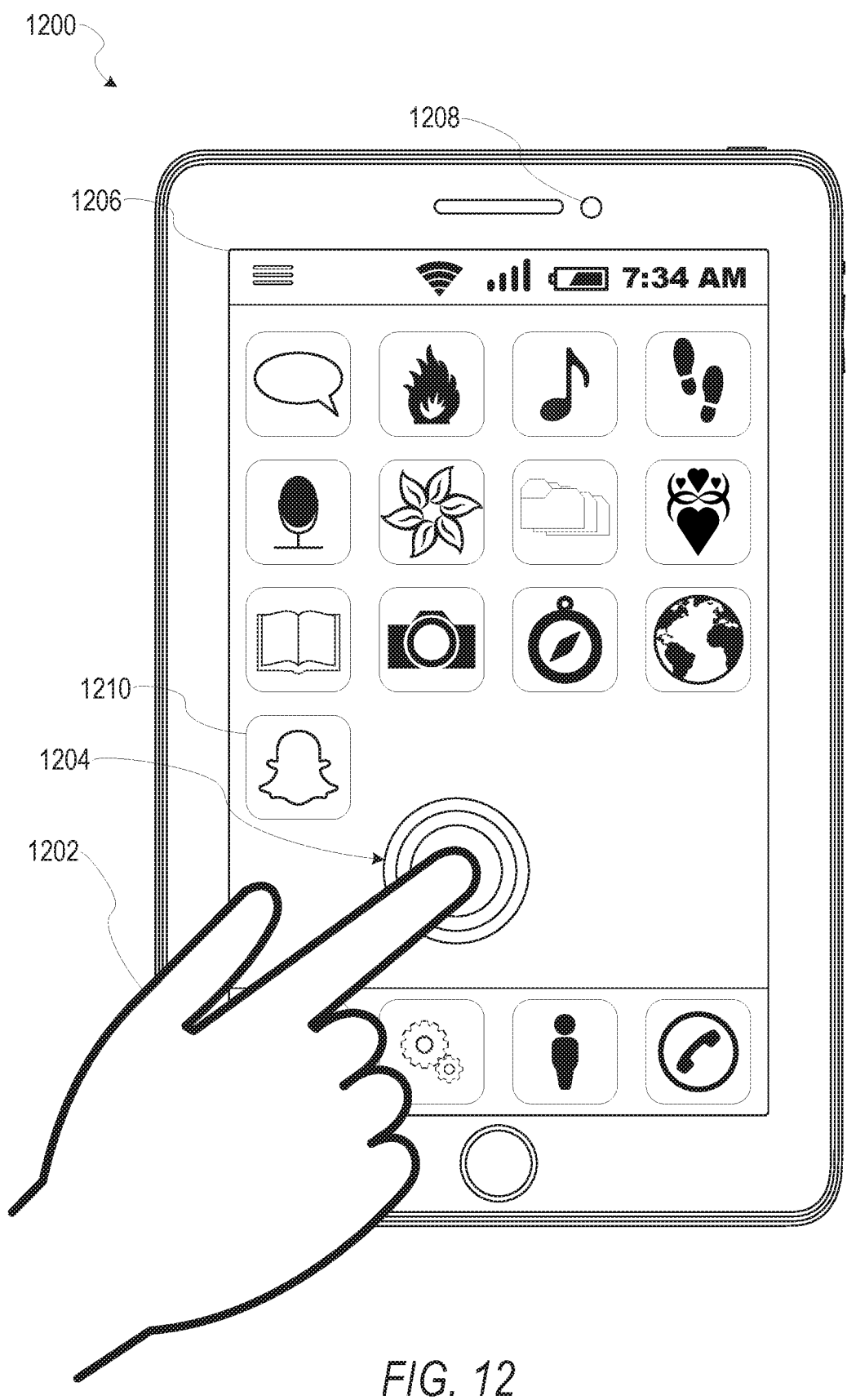
FIG. 12 is a user interface diagram depicting an example mobile device and mobile operating system interface, according to some example embodiments.

FIG. 12 illustrates an example mobile device 1200 executing a mobile operating system (e.g., IOS™, ANDROID™, WINDOWS® Phone, or other mobile operating systems), consistent with some embodiments. In one embodiment, the mobile device 1200 includes a touch screen operable to receive tactile data from a user 1202. For instance, the user 1202 may physically touch 1204 the mobile device 1200, and in response to the touch 1204, the mobile device 1200 may determine tactile data such as touch location, touch force, or gesture motion. In various example embodiments, the mobile device 1200 displays a home screen 1206 (e.g., Springboard on IOS™) operable to launch applications or otherwise manage various aspects of the mobile device 1200. In some example embodiments, the home screen 1206 provides status information such as battery life, connectivity, or other hardware statuses. The user 1202 can activate user interface elements by touching an area occupied by a respective user interface element. In this manner, the user 1202 interacts with the applications of the mobile device 1200. For example, touching the area occupied by a particular icon included in the home screen 1206 causes launching of an application corresponding to the particular icon.

The mobile device 1200, as shown in FIG. 12, includes an imaging device 1208. The imaging device 1208 may be a camera or any other device coupled to the mobile device 1200 capable of capturing a video stream or one or more successive images. The imaging device 1208 may be triggered by the distributing audio/visual media within a networked system 100 or a selectable user interface element to initiate capture of a video stream or succession of images and pass the video stream or succession of images to the distributing audio/visual media within the networked system 100 for processing according to the one or more methods described in the present disclosure.

Many varieties of applications (also referred to as "apps") can be executing on the mobile device 1200, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1200 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1200 includes a social messaging app 1210 such as SNAPCHAT® that, consistent with some embodiments, allows users to exchange ephemeral messages that include media content. In this example, the social messaging app 1210 can incorporate aspects of embodiments described herein. For example, in some embodiments the social messaging app 1210 includes an ephemeral gallery of media created by users the social messaging app 1210. These galleries may consist of videos or pictures posted by a user and made viewable by contacts (e.g., "friends") of the user. Alternatively, public galleries may be created by administrators of the social messaging app 1210 consisting of media from any users of the app 1210 (and accessible by all users). In yet another embodiment, the social messaging app 1210 may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the media distribution system 160 may provide access to media content within the ephemeral message, and transmit the ephemeral message to another device using the ephemeral message system.

Software Architecture

Figure 13:
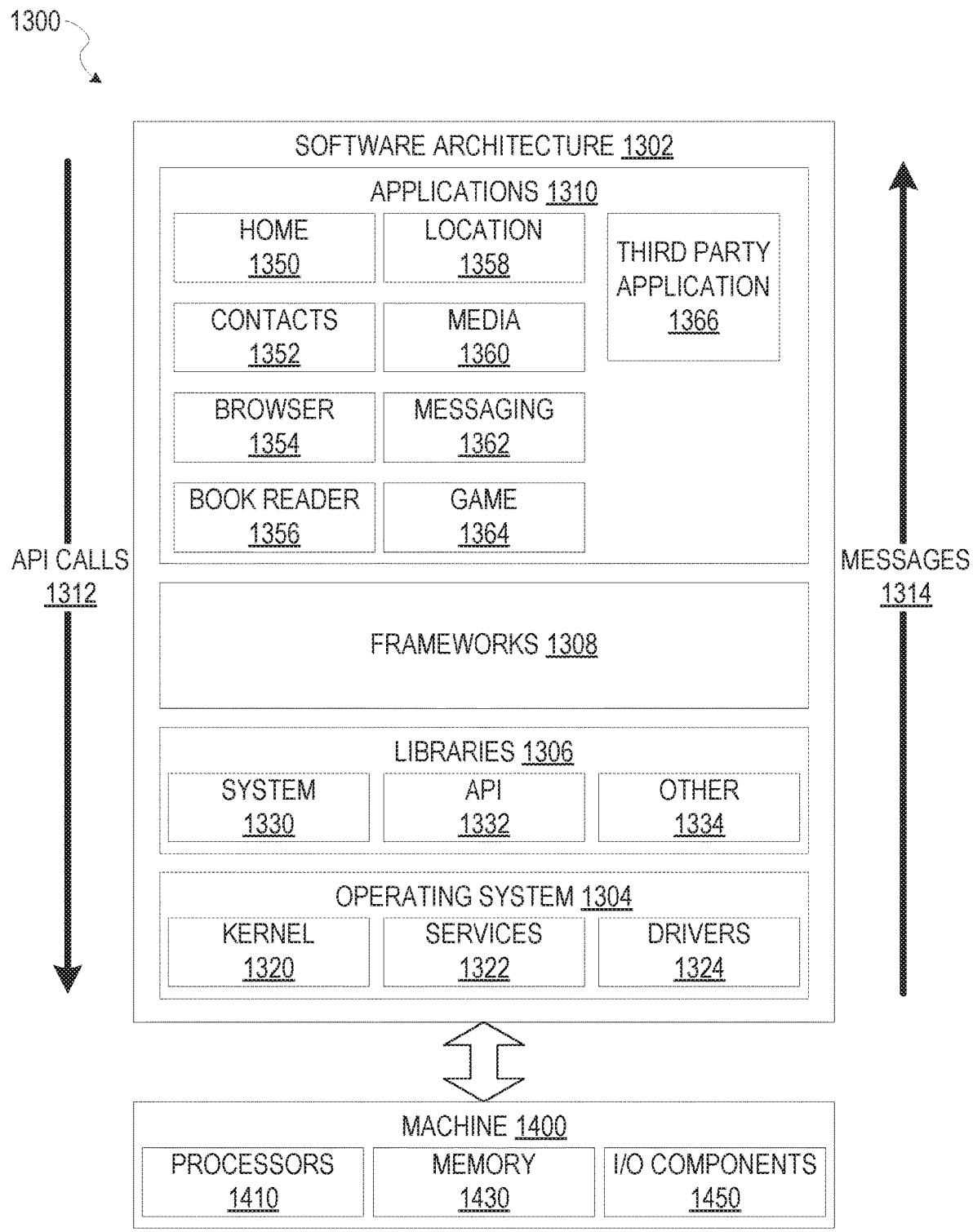
FIG. 13 is a block diagram illustrating an example of a software architecture that may be installed on a machine, according to some example embodiments.

FIG. 13 is a block diagram 1300 illustrating an architecture of software 1302, which can be installed on the devices described above. FIG. 13 is merely a non-limiting example of a software architecture, and it will be appreciated that many other architectures can be implemented to facilitate the functionality described herein. In various embodiments, the software 1302 is implemented by hardware such as machine a 1400 of FIG. 14 that includes processors 1410, memory 1430, and I/O components 1450. In this example architecture, the software 1302 can be conceptualized as a stack of layers where each layer may provide a particular functionality. For example, the software 1302 includes layers such as an operating system 1304, libraries 1306, frameworks 1308, and applications 1310. Operationally, the applications 1310 invoke application programming interface (API) calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphic user interface (GUI) functions, high-level resource management, high-level location services, and so forth. The frameworks 1308 can provide a broad spectrum of other APIs that can be utilized by the applications 1310, some of which may be specific to a particular operating system or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications, such as a third-party application 1366. According to some embodiments, the applications 1310 are programs that execute functions defined in the programs. Various programming languages can be employed to create the applications 1310, structured in a variety of manners, such as object-oriented programming languages (e.g., Objective-C, Java, or C++) or procedural programming languages (e.g., C or assembly language). In a specific example, the third-party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third-party application 1366 can invoke the API calls 1312 provided by the operating system 1304 to facilitate functionality described herein.

Example Machine Architecture and Machine-Readable Medium

Figure 14:
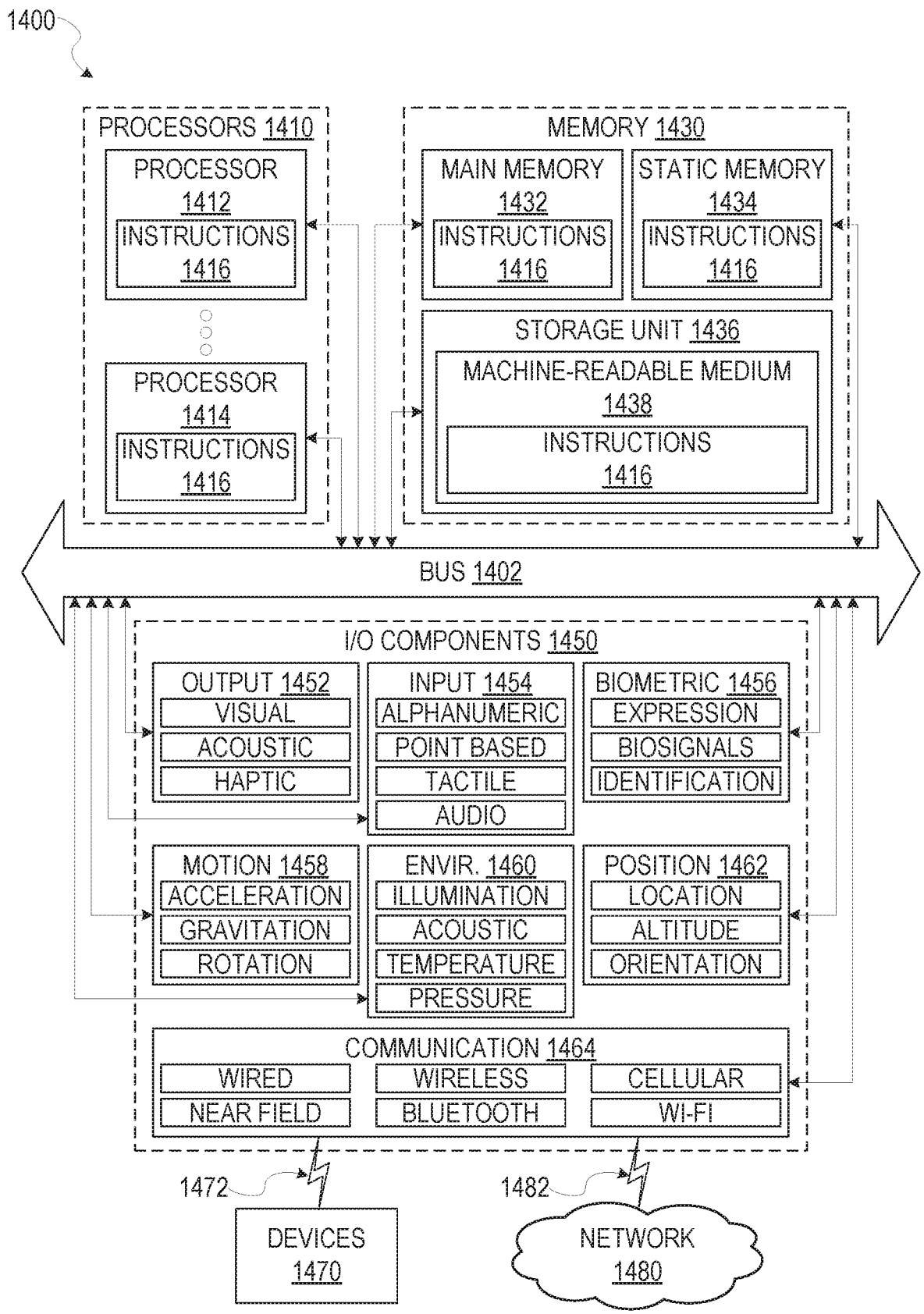
FIG. 14 is a block diagram presenting a diagrammatic representation of a machine in the form of a computer system within which a set of instructions may be executed for causing the machine to perform any of the methodologies discussed herein, according to an example embodiment.

FIG. 14 is a block diagram illustrating components of a machine 1400, according to some embodiments, able to read instructions (e.g., processor executable instructions) from a machine-readable medium (e.g., a non-transitory machine-readable storage medium) and perform any of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any of the methodologies discussed herein can be executed. In alternative embodiments, the machine 1400 operates as a standalone device or can be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any of the methodologies discussed herein.

In various embodiments, the machine 1400 comprises processors 1410, memory 1430, and I/O components 1450, which can be configured to communicate with each other via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1412 and a processor 1414 that may execute the instructions 1416. The term "processor" is intended to include multi-core processors that may comprise two or more independent processors (also referred to as "cores") that can execute instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory 1430 comprises a main memory 1432, a static memory 1434, and a storage unit 1436 accessible to the processors 1410 via the bus 1402, according to some embodiments. The storage unit 1436 can include a machine-readable medium 1438 on which are stored the instructions 1416 embodying any of the methodologies or functions described herein. The instructions 1416 can also reside, completely or at least partially, within the main memory 1432, within the static memory 1434, within at least one of the processors 1410 (e.g., within the processor's cache memory), or any suitable combination thereof, during execution thereof by the machine 1400. Accordingly, in various embodiments, the main memory 1432, the static memory 1434, and the processors 1410 are considered machine-readable media 1438.

As used herein, the term "memory" refers to a machine-readable medium 1438 able to store data temporarily or permanently and may be taken to include, but not be limited to, random-access memory (RAM), read-only memory (ROM), buffer memory, flash memory, and cache memory. While the machine-readable medium 1438 is shown in an example embodiment to be a single medium, the term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by processors of the machine 1400 (e.g., processors 1410), cause the machine 1400 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1450 include a wide variety of components to receive input, provide output, produce output, transmit information, exchange information, capture measurements, and so on. In general, it will be appreciated that the I/O components 1450 can include many other components that are not shown in FIG. 14. The I/O components 1450 are grouped according to functionality merely for simplifying the following discussion, and the grouping is in no way limiting. In various example embodiments, the I/O components 1450 include output components 1452 and input components 1454. The output components 1452 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1454 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1450 include biometric components 1456, motion components 1458, environmental components 1460, or position components 1462, among a wide array of other components. For example, the biometric components 1456 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 include acceleration sensor components (e.g., accelerometer), gravitation sensor components, rotation sensor components (e.g., gyroscope), and so forth. The environmental components 1460 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1462 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 include a network interface component or another suitable device to interface with the network 1480. In further examples, communication components 1464 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1470 may be another machine or any of a wide variety of peripheral devices (e.g., a peripheral device coupled via a Universal Serial Bus (USB)).

Moreover, in some embodiments, the communication components 1464 detect identifiers or include components operable to detect identifiers. For example, the communication components 1464 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1464, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1416 are transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, in other example embodiments, the instructions 1416 are transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Furthermore, the machine-readable medium 1438 is non-transitory (in other words, not having any transitory signals)

in that it does not embody a propagating signal. However, labeling the machine-readable medium 1438 "non-transitory" should not be construed to mean that the medium is incapable of movement; the medium should be considered as being transportable from one physical location to another. Additionally, since the machine-readable medium 1438 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, at a messaging server, a notification indicating dispensing of an image capture device by a dispersal machine, the notification comprising an identifier associated with the image capture device;
   in response to receiving the notification of dispensing the image capture device, generating a media distribution session associated with the identifier;
   publishing, by the messaging server, one or more media instances to the media distribution session by associating the media distribution session and the identifier with the one or more media instances;
   receiving, by the messaging server, one or more access requests for the media distribution session, the one or more access requests including the identifier and an indication of a requesting device; and
   responsive to the one or more access requests, transmitting, by the messaging server, at least a portion of the one or more media instances to the requesting device.

2. The method of claim 1 further comprising:
   receiving, by the messaging server from the dispersal machine, a dispersal notification representing selection of the image capture device for dispensing by the dispersal machine;
   generating the identifier for the image capture device;
   associating, by the messaging server, the identifier with the image capture device and the media distribution session; and
   transmitting an identification receipt to the dispersal machine prior to the dispersal machine dispensing the image capture device, the identification receipt including the identifier.

3. The method of claim 2, wherein the identification receipt is configured to be displayed at the dispersal machine contemporaneous with the dispensing of the image capture device.

4. The method of claim 1 further comprising:
   receiving, by the messaging server from a client device, a dispersal notification comprising a device code representing the image capture device;
   generating the identifier for the image capture device;
   associating, by the messaging server, the identifier with the image capture device and the media distribution session; and
   in response to receiving the dispersal notification from the client device, transmitting an identification receipt to the client device, the identification receipt including the identifier.

5. The method of claim 1 further comprising:
   receiving, by the messaging server, a pairing notification including the identifier and a client identifier representing a client device; and
   associating the identifier with the media distribution session.

6. The method of claim 5 further comprising:
   receiving the one or more media instances from the client device, the one or more media instances including the identifier and a device code representing the client device; and
   publishing the one or more media instances to the media distribution session responsive to receiving the one or more media instances from the client device.

7. The method of claim 1 further comprising:
   receiving, by the messaging server, a set of media instances from the dispersal machine, the set of media instances including the one or more media instances and received as a batch responsive to the dispersal machine receiving the image capture device at a time subsequent to dispensing the image capture device.

8. A system comprising:
one or more processors of a messaging server; and
a non-transitory processor-readable storage medium storing processor-executable instructions that, when executed by the one or more processors, cause the one or more processors to perform operations comprising:
receiving, at the messaging server, a notification indicating dispensing of an image capture device by a dispersal machine, the notification comprising an identifier associated with the image capture device;
in response to receiving the notification of dispensing the image capture device, generating a media distribution session associated with the identifier;
publishing, by the messaging server, one or more media instances to the media distribution session by associating the media distribution session and the identifier with the one or more media instances;
receiving, by the messaging server, one or more access requests for the media distribution session, the one or more access requests including the identifier and an indication of a requesting device; and
responsive to the one or more access requests, transmitting, by the messaging server, at least a portion of the one or more media instances to the requesting device.

9. The system of claim 8, wherein the operations further comprise:
receiving, by the messaging server from the dispersal machine, a dispersal notification representing selection of the image capture device for dispensing by the dispersal machine;
generating the identifier for the image capture device;
associating, by the messaging server, the identifier with the image capture device and the media distribution session; and
transmitting an identification receipt to the dispersal machine prior to the dispersal machine dispensing the image capture device, the identification receipt including the identifier.

10. The system of claim 9, wherein the identification receipt is configured to be displayed at the dispersal machine contemporaneous with the dispensing of the image capture device.

11. The system of claim 8, wherein the operations further comprise:
receiving, by the messaging server from a client device, a dispersal notification comprising a device code representing the image capture device;
generating the identifier for the image capture device;
associating, by the messaging server, the identifier with the image capture device and the media distribution session; and
in response to receiving the dispersal notification from the client device, transmitting an identification receipt to the client device, the identification receipt including the identifier.

12. The system of claim 8, wherein the operations further comprise:
receiving, by the messaging server, a pairing notification including the identifier and a client identifier representing a client device; and
associating the identifier with the media distribution session.

13. The system of claim 12, wherein the operations further comprise:
receiving the one or more media instances from the client device, the one or more media instances including the identifier and a device code representing the client device; and
publishing the one or more media instances to the media distribution session responsive to receiving the one or more media instances from the client device.

14. The system of claim 8, wherein the operations further comprise:
receiving, by the messaging server, a set of media instances from the dispersal machine, the set of media instances including the one or more media instances and received as a batch responsive to the dispersal machine receiving the image capture device at a time subsequent to dispensing the image capture device.

15. A non-transitory processor-readable storage medium storing processor-executable instructions that, when executed by a processor of a machine, cause the machine to perform operations comprising:
receiving, at a messaging server, a notification indicating dispensing of an image capture device by a dispersal machine, the notification comprising an identifier associated with the image capture device;
in response to receiving the notification of dispensing the image capture device, generating a media distribution session associated with the identifier;
publishing, by the messaging server, one or more media instances to the media distribution session by associating the media distribution session and the identifier with the one or more media instances;
receiving, by the messaging server, one or more access requests for the media distribution session, the one or more access requests including the identifier and an indication of a requesting device; and
responsive to the one or more access requests, transmitting, by the messaging server, at least a portion of the one or more media instances to the requesting device.

16. The non-transitory processor-readable storage medium of claim 15, wherein the operations further comprise:
receiving, by the messaging server from the dispersal machine, a dispersal notification representing selection of the image capture device for dispensing by the dispersal machine;
generating the identifier for the image capture device;
associating, by the messaging server, the identifier with the image capture device and the media distribution session; and
transmitting an identification receipt to the dispersal machine prior to the dispersal machine dispensing the image capture device, the identification receipt including the identifier.

17. The non-transitory processor-readable storage medium of claim 15, wherein the operations further comprise:
receiving, by the messaging server from a client device, a dispersal notification comprising a device code representing the image capture device;
generating the identifier for the image capture device;
associating, by the messaging server, the identifier with the image capture device and the media distribution session; and in response to receiving the dispersal notification from the client device, transmitting an identification receipt to the client device, the identification receipt including the identifier.

18. The non-transitory processor-readable storage medium of claim 15, wherein the operations further comprise:

receiving, by the messaging server, a pairing notification including the identifier and a client identifier representing a client device; and associating the identifier with the media distribution session.

19. The non-transitory processor-readable storage medium of claim 18, wherein the operations further comprise:

receiving the one or more media instances from the client device, the one or more media instances including the identifier and a device code representing the client device; and publishing the one or more media instances to the media distribution session responsive to receiving the one or more media instances from the client device.

20. The non-transitory processor-readable storage medium of claim 15, wherein the operations further comprise:

receiving, by the messaging server, a set of media instances from the dispersal machine, the set of media instances including the one or more media instances and received as a batch responsive to the dispersal machine receiving the image capture device at a time subsequent to dispensing the image capture device.

\* \* \* \* \*